(12) United States Patent
Fuchikami et al.

(10) Patent No.: US 7,856,568 B2
(45) Date of Patent: Dec. 21, 2010

(54) ELECTRONIC APPARATUS AND PEAK POWER-CONTROLLING METHOD RELATED THERETO

(75) Inventors: Ryuji Fuchikami, Fukuoka (JP);
Toshihiro Ishikawa, Kanagawa (JP);
Takashi Nishitoba, Kanagawa (JP);
Takayuki Sasaki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 847 days.

(21) Appl. No.: 11/792,719

(22) PCT Filed: Dec. 5, 2005

(86) PCT No.: PCT/JP2005/022720

§ 371 (c)(1),
(2), (4) Date: Jun. 11, 2007

(87) PCT Pub. No.: WO2006/064743

PCT Pub. Date: Jun. 22, 2006

(65) Prior Publication Data

US 2007/0266269 A1 Nov. 15, 2007

(30) Foreign Application Priority Data

Dec. 14, 2004 (JP) .......................... 2004-361853
Mar. 22, 2005 (JP) .......................... 2005-081765

(51) Int. Cl.
*G06F 1/26* (2006.01)
*G06F 1/32* (2006.01)

(52) U.S. Cl. .................. 713/322; 713/300; 713/320; 713/323; 713/324; 713/330; 710/8; 710/15; 710/62

(58) Field of Classification Search .................. 713/300, 713/320, 322, 323, 324, 330; 710/8, 15, 710/62
See application file for complete search history.

(56) References Cited

U.S. PATENT DOCUMENTS

| 5,828,568 | A | * | 10/1998 | Sunakawa et al. | ............. 700/79 |
| 5,894,579 | A | | 4/1999 | Fujihara | |
| 2005/0066205 | A1 | * | 3/2005 | Holmer | ....................... 713/320 |

FOREIGN PATENT DOCUMENTS

| JP | 9-231195 | 9/1997 |
| JP | 9-237138 | 9/1997 |
| JP | 2002-358167 | 12/2002 |
| JP | 2004-334582 | 11/2004 |

OTHER PUBLICATIONS

"Advanced Configuration and Power Interface Specification Rev 2.0", Advanced Configuration and Power Interface Specification, Jul. 27, 2000, pp. complete 481.

* cited by examiner

Primary Examiner—Chun Cao
Assistant Examiner—Michael J Brown
(74) Attorney, Agent, or Firm—Wenderoth, Lind & Ponack, L.L.P.

(57) ABSTRACT

An electronic apparatus (200) comprises processors (20)-(22), devices (30)-(33), and a peak power-managing unit (10). The peak power-managing unit (10) includes a power information storage unit (11) operable to store a total power consumption value, and a suspended request storage unit (12) operable to store suspended use requests. Each of the processors (20)-(22) addresses, to the peak power-managing unit (10), a use request for the use of a target device among the devices (30)-(33). The peak power-managing unit (10) issues a device use permit notification to the processor when determining that the operation of the target device still maintains an added total power consumption value within a specified value. Upon receipt of the device use permit notification, the processor sets up a course of action to be provided by the target device. As a result, controlled peak power is provided, and the devices can be run according to updated information.

18 Claims, 20 Drawing Sheets

Fig. 3

| sequence | processor 20 | | | peak power-managing unit 10 maximum available electrical power=500mW | device 30 200mW | device 31 300mW | device 32 400mW |
|---|---|---|---|---|---|---|---|
| | thread A | thread B | thread C | | | | |
| 1 | use request of D30 | | | | | | |
| 2 | | | | 0(C)+200(D30)=200mW(T) request(D30) permitted | | | |
| 3 | start using D30 | | | | start operation | | |
| 4 | | use request of D31 | | | | | |
| 5 | | | | 200(C)+300(D31)=500mW(T) request(D31) permitted | | | |
| 6 | | start using D31 | | | | start operation | |
| 7 | | | use request of D32 | | | | |
| 8 | | | | 500(C)+400(D32)=900mW(T) request(D32) suspended | | | |
| 9 | end using D30 | | | | end operation | | |
| 10 | | | | 500(C)-200(D30)=300mW(T) 300(T)+400(D32)=700mW(T) request(D32) continuously suspended | | | |
| 11 | | end using D31 | | | | end operation | |
| 12 | | | | 300(C)-300(D31)=0mW(T) 0(T)+400(D32)=400mW(T) request(D32) permitted | | | |
| 13 | | | request use of D32 | | | | |
| 14 | | | end using D32 | | | | start operation |
| 15 | | | | 400(C)-400(D32)=0mW(T) | | | end operation |

C: current, T: total, D30: device 30, D31: device 31, D32: device 32

ELECTRONIC APPARATUS AND PEAK POWER-CONTROLLING METHOD RELATED THERETO

TECHNICAL FIELD

The present invention relates to a peak power-controlling art for use in an electronic apparatus including several processors acting as master devices and several devices acting as slave devices.

BACKGROUND ART

In battery-driven information terminals in recently widespread use, maximum peak power consumed by the entire apparatus is important in terms of battery capacity design, and there has been developed a maximum peak power-suppressing art achievable by prohibiting the concurrent use of a variety of peripheral devices in the apparatus. For example, cited Reference No. 1, published Japanese Patent Application Laid-Open No. (HEI) 9-237138, discloses an art in which there is provided a block for queuing a request made by a processor to operate peripheral devices, whereby the peripheral devices have a total power consumption value controllably maintained within a certain value.

FIG. 20 is a block diagram illustrating a prior art power consumption-managing apparatus. FIG. 20 is a simplified block diagram based on FIG. 4 disclosed by cited Reference No. 1. The power consumption-managing apparatus includes a processor 1, devices 3, 4, and 5 such as a FDD, CD-ROM, and HDD, and a power-managing unit 2. The processor 1 is operable to execute several threads. Each of the threads makes a request to the power-managing unit 2 for the use of any one of the devices 3-5. The power-managing unit 2 includes a queue-controlling program operable to manage the power consumption of each of the devices. The program sends out a permitted request to each control program in the devices 3-5, such that a total power consumption value required for all of the permitted requests remains within the maximum system power source value.

FIG. 21 is a diagram illustrating a control sequence of the prior art power consumption-managing apparatus. The following discusses in detail, with reference to the control sequence diagram of FIG. 21, a power consumption-controlling method for use in the prior art power consumption-managing apparatus of FIG. 20.

The processor 1 determines a course of action to be provided by the device 3. At time "T1", the processor 1 sends out a request for the use of the device 3 to the power-managing unit 2. The power-managing unit 2 queues the use request from the processor 1 in a waiting line. When the use request comes to the head of the queuing, then the power-managing unit 2 ascertains that a total power consumption value of all of the operating devices including the target device 3 is equal to or smaller than the maximum system power source value. At time "T2", the power-managing unit 2 sends the use request to the device 3. The device 3 in receipt of the use request from the power-managing unit 2 performs a predetermined course of action. When completing the course of action, then at time "T3", the device 3 sends a completion notification on the course of action to the power-managing unit 2. At time "T4", the power-managing unit 2 sends a notification of the completed use of the device 3 to the processor 1.

As described above, when using the peripheral devices, the prior art power consumption-managing apparatus has control of the maximum power consumption in such a manner that the maximum power consumption is limited to at most the maximum power value of a system power source. However, as illustrated in FIG. 21, according to the prior art construction, the processor 1 that addressed the device use request is impossible to exactly understand how long the request is held in the waiting line by the power-managing unit 2. This means that there is a problem in that the devices are objectionably operated in accordance with already received, pre-updated information, even when data to be sent to the device 3 is updated or otherwise cancelled during the queuing. In addition, the processor 1 is impossible to grasp how the device use request is being handled, until receiving the completion notification that the device 3 has completed the course of action. Furthermore, the several devices 3-5 cannot be used in the order of device use priority.

In view of the above, an object of the present invention is to provide an electrical power-managing art operable to provide controlled peak power to an electronic apparatus including several processors and several devices, and operable to operate the devices in accordance with constantly updated information.

DISCLOSURE OF THE INVENTION

A first aspect of the present invention provides an electronic apparatus including a processor acting as a master device, in which the processor is operable to process a plurality of threads, a plurality of devices, each of which acts as a slave device, and a peak power-managing unit operable to manage peak power. In the electronic apparatus according to the first aspect of the present invention, the processor addresses, to the peak power-managing unit, a device use request for the use of a target device among the plurality of devices when the processor processes the plurality of threads; the peak power-managing unit in receipt of the device use request issues, to the processor, a device use permit notification that permits the device use request, when determining that a total power consumption value is equal to or smaller than a predetermined value, in which the total power consumption value includes a power consumption value added by the operation of the target device; and the processor in, receipt of the device use permit notification sets up a course of action to be provided by the target device.

According to the above structure, the processor addresses a request for the use of one of the devices when processing the threads, and then the peak power-managing unit allows the processor to use the device only when the operation of the device still maintains an added total power consumption value within a predetermined value. As a result, the peak power remains within a permissible value. In addition, the processor can set up a course of action to be provided by the device, after receipt of a notification that permits the use of the device, and the devices can be operated in accordance with constantly updated information.

A second aspect of the present invention provides an electronic apparatus in which the peak power-managing unit includes a power information storage unit operable to store electrical power information on a current power consumption value and a suspended request storage unit operable to store and suspend the device use requests addressed by the processor for the plurality of devices. In the electronic apparatus according to the second aspect of the present invention, the processor addresses a device use request to the peak power-managing unit when using a target device among the plurality of devices; and the peak power-managing unit in receipt of the device use request issues, to the processor that addressed the device use request, a device use permit notification that permits the device use request, when the peak power-managing unit determines, with reference to the power information stored in the power information storage unit, that a total power consumption value is equal to or smaller than a predetermined value, in which the total power consumption value includes a power consumption value added by the operation of the target device, but the peak power-managing unit suspends and stores the device use request in the suspended request storage unit when determining, with reference to the power information stored in the power information storage unit, that the total power consumption value is greater than the predetermined value.

According to the above structure, when several processors acting as master devices uses several devices serving as slave devices, one of the processors addresses a request for the use of one of the devices in order to process the threads, and then the peak power-managing unit permits the processor to use the device only when the operation of the device still maintains an added total power consumption value equal to or smaller than a predetermined value. As a result, the peak power remains within the permissible value. In addition, when the added total power consumption value exceeds the predetermined value in response to the operation of the device, then the peak power-managing unit suspends and stores the device use request in the suspended request storage unit. As a result, the suspended request stored therein can be used to determine device availability again when a completed course of action of another device provides sufficient a total power consumption value.

A third aspect of the present invention provides an electronic apparatus in which when any one of the plurality of devices completes a course of action, the peak power-managing unit determines device availability with reference to the device use requests stored in the suspended request storage unit, in chronological order in which they are stored in the suspended request storage unit.

According to the above structure, the device available is determinable with reference to the suspended device use requests in chronological order in which they are stored in the suspended request storage unit.

A fourth aspect of the present invention provides an electronic apparatus in which the peak power-managing unit further comprises a priority-comparing unit. In the electronic apparatus according to the fourth aspect of the present invention, the processor addresses a device use request containing device use priority to the peak power-managing unit when using a target device among the plurality of devices; and the priority-comparing unit compares a device use priority between the target device and an operating device, and when the operating device is lower in device use priority than the target device, then the peak power-managing unit interrupts the operation of the operating device, thereby issuing the device use permit notification to the target device.

According to the above structure, when there arises a request for the use of a higher-prioritized device, the request can be fulfilled by the step in which the use of a lower-prioritized device is temporarily interrupted to operate the higher-prioritized device, provided that the aforesaid step still maintains added total power consumption value within a predetermined value.

A fifth aspect of the present invention provides an electronic apparatus in which the peak power-managing unit issues an interruption instruction to a thread when the peak power-managing unit interrupts the operation of the operating device, in which the operating device was activated by the thread.

According to the above structure, when there arises a request for the use of a higher-prioritized device, the request can be fulfilled by the step in which the use of a lower-prioritized device is temporarily interrupted to operate the higher-prioritized device, provided that the aforesaid step still maintains an added total power consumption value within a predetermined value.

A sixth aspect of the present invention provides an electronic apparatus in which the peak power-managing unit further comprises a priority-comparing unit. In the electronic apparatus according to the sixth aspect of the present invention, the processor addresses a device use request containing device use priority to the peak power-managing unit when using a target device among the plurality of devices; and the priority-comparing unit compares a device use priority between the target device and an operating device, and when the operating device is lower in the device use priority than the target device, then the peak power-managing unit reduces the power consumption of the operating device, thereby issuing the device use permit notification to the target device.

A seventh aspect of the present invention provides an electronic apparatus in which the peak power-managing unit reduces at least one of a clock frequency of the operating device that is lower in the device use priority, and the power source voltage thereof.

According to the above structure, when there arises a request for the use of a higher-prioritized device, the request can be fulfilled by the step in which the use of a lower-prioritized device is temporarily interrupted to operate the higher-prioritized device, provided that the aforesaid step still maintains an added total power consumption value within a predetermined value. The power consumption of the lower-prioritized device can be reduced through a reduction in clock frequency of the lower-prioritized device or a reduction in power voltage thereof.

An eighth aspect of the present invention provides an electronic apparatus in which the peak power-managing unit further comprises a priority-comparing unit. In the electronic apparatus according to the eighth aspect of the present invention, the processor addresses a device use request containing device use priority to the peak power-managing unit when using a target device among the plurality of devices; and the priority-comparing unit compares a device use priority between the target device and an operating device, and when the operating device is lower in device use priority than the target device, then the peak power-managing unit increases the power consumption of the operating device.

A ninth aspect of the present invention provides an electronic apparatus in which the peak power-managing unit increases at least one of a clock frequency of the operating device that is lower in the device use priority, and the power source voltage thereof.

According the above structures, when there arises a request for the use of a higher-prioritized device, a clock frequency or power voltage of a lower-prioritized device is increased to increase the power consumption of the lower-prioritized device, while the lower-prioritized device is allowed to complete a course of action as soon as possible, thereby securely providing power consumption required for the higher-prioritized device. As a result, the request for the use of the higher-prioritized device can be fulfilled as soon as possible, provided that the operation of the higher-prioritized device still maintains an added total power consumption value within a predetermined value.

A tenth aspect of the present invention provides an electronic apparatus in which the peak power-managing unit further comprises a priority-comparing unit. In the electronic apparatus according to the tenth aspect of the present invention, the processor addresses a device use request containing device use priority to the peak power-managing unit when using a target device among the plurality of devices; the peak power-managing unit suspend and stores the device use request in the suspended request storage unit when determining that a total power consumption value is greater than a predetermined value, in which the total power consumption value includes a power consumption value added by the operation of the target device; and when any one of the plurality of devices completes a course of action, then the peak power-managing unit determines device availability with reference to the device use requests stored in the suspended request storage unit, in descending order of the device use priority.

According to the above structure, the device available is determinable with reference to the suspended device use requests sequentially in the descending order of the priority.

An eleventh aspect of the present invention provides an electronic apparatus in which the peak power-managing unit further comprises a peak power-detecting unit operable to detect a peak power-consumption value, in which the peak power-detecting unit updates the electrical power information stored in the power information storage unit each time when detecting the peak power-consumption value.

The above structure allows the peak power-managing unit to always grasp the peak power consumed by the electronic apparatus.

A twelfth aspect of the present invention provides an electronic apparatus including a processor acting as a master device, a plurality of devices, each of which acts as a slave device, a peak power-managing unit operable to manage peak power, and a power-measuring unit operable to measure a power consumption value of each of the plurality of devices, in which the peak power-managing unit includes a suspended request storage unit operable to store and suspend device use requests addressed by the processor for the plurality of devices. In the electronic apparatus according to the twelfth aspect of the present invention, the processor addresses a device use request to the peak power-managing unit when using a target device among the plurality of devices; the peak power-managing unit in receipt of the device use request issues, to the processor that addressed the device use request, a device use permit notification that permits the device use request, when the peak power-managing unit determines, with reference to a current power consumption value from the power-measuring unit, that a total power consumption value is equal to or smaller than a predetermined value, in which the total power consumption value includes a power consumption value added by the operation of the target device, but the peak power-managing unit suspends and stores the device use request in the suspended request storage unit when determining that the total power consumption value is greater than the predetermined value; and the processor in receipt of the device use permit notification sets up a course of action to be provided by the target device.

According to the above structure, permission to use the target device is determined based on a power consumption value measured in real time by the power-measuring unit. Referencing the real-time measurable power consumption value provides control over the electrical power within fine limits.

A thirteenth aspect of the present invention provides an electronic apparatus, further including a battery unit including a residual quantity-managing unit operable to manage residual electrical power quantity, in which the processor addresses, to the peak power-managing unit, a device use request for the use of a target device among the plurality of devices when the processor uses the target device among the plurality of devices; and the peak power-managing unit in receipt of the device use request issues, to the processor, a use permit notification that permits the device use request, when the peak power-managing unit determines that a total power consumption value is equal to or smaller than a predetermined value. The total power consumption value includes a power consumption value added by the operation of the target device. The predetermined value is calculated based on the residual electrical power quantity from the residual quantity-managing unit.

According to the above structure, permission to use the target device is determined based on the residual quantity of the battery operable to supply the electronic apparatus with the electrical power. Referencing the residual quantity of the battery or a real power supply source provides optimum control over the electrical power.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is an illustration showing exemplified peak power control according to the first embodiment;

BEST MODE FOR CARRYING OUT THE INVENTION

Embodiments of the present invention are now described with reference to the accompanying drawings.

First Embodiment

Figure 1:
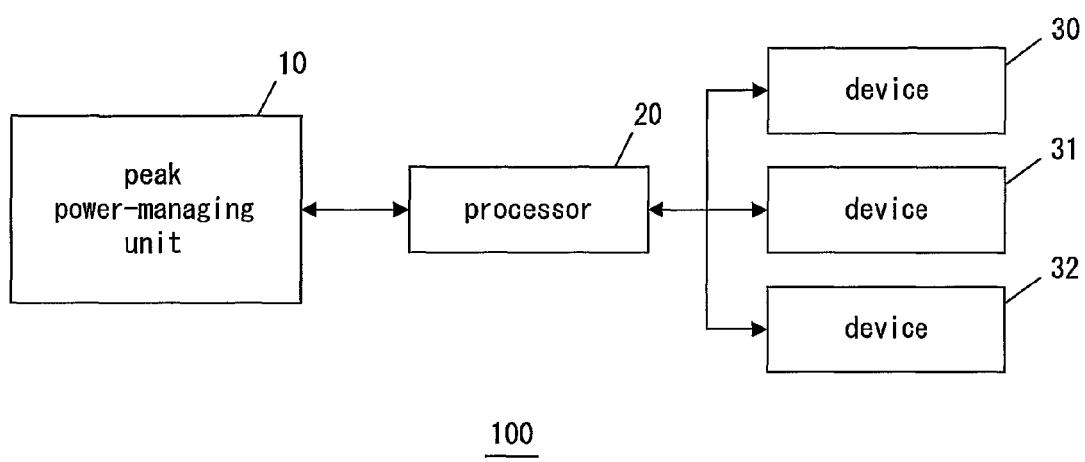
FIG. 1 is a block diagram illustrating an electronic apparatus according to a first embodiment of the present invention.

FIG. 1 is a block diagram illustrating an electronic apparatus 100 according to a first embodiment of the present invention. The electronic apparatus 100 according to the present embodiment includes a processor 20, devices 30, 31, and 32, and a peak power-managing unit 10. The processor 20 is operable to process several threads. The following discusses a course of action provided by the electronic apparatus 100 according to the present embodiment.

Figure 2:
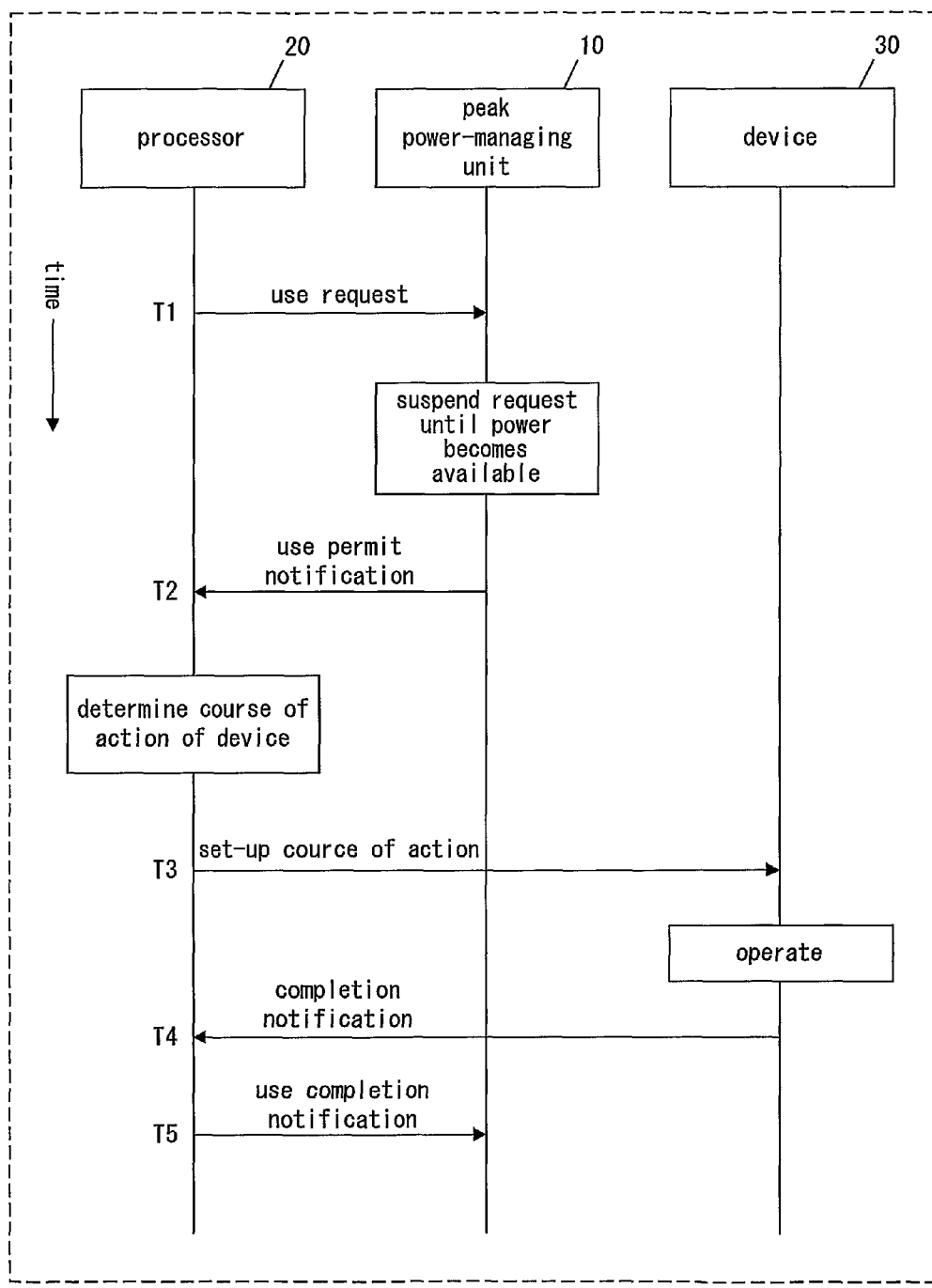
FIG. 2 is a diagram illustrating a control sequence of the electronic apparatus according to the first embodiment.

FIG. 2 is a diagram illustrating a control sequence of the electronic apparatus 100 according to the present embodiment. The vertical axis of FIG. 2 represents time that elapses along the vertical axis from the top to the bottom thereof.

Now, assume that the processor 20 is treating threads "A", "B", and "C". Further assume that, at time "T1", the processor 20 addresses a request for the use of the device 30 to the peak power-managing unit 10 in order to process the thread "A".

Upon receipt of the use request from the processor 20, the peak power-managing unit 10 determines whether the operation of the device 30 still maintains an added total power consumption value within a predetermined value. When the determination results in "YES" or that "the added total power consumption value still remains within the predetermined value", then the peak power-managing unit 10 immediately issues a use permit notification to the processor 20. Conversely, when the determination results in "NO" or that "the added total power consumption value is greater than the predetermined value", then the peak power-managing unit 10 temporarily suspends the request for the use of the device 30. When the total power consumption value is reduced by the completed course of action of one of the remaining devices, and when the peak power-managing unit 10 determines that the added total power consumption value remains within the predetermined value during the operation of the device 30, then at time "T2", the peak power-managing unit 10 issues the use permit notification to the processor 20.

Upon receipt of the use permit notification, the processor 20 determines a course of action to be provided by the device 30 at that time, to process the thread "A". At time "T3", the processor 20 sets up the determined course of action of the device 30'.

The device 30 is operated in accordance with the set-up course of action from the processor 20. When completing the set-up course of action, then at time "T4", the device 30 issues a completion notification to the processor 20.

Upon receipt of the completion notification from the device 30, then at time "T5", the processor 20 issues a notification of the completed use of the device 30 to the peak power-managing unit 10.

Figure 21:
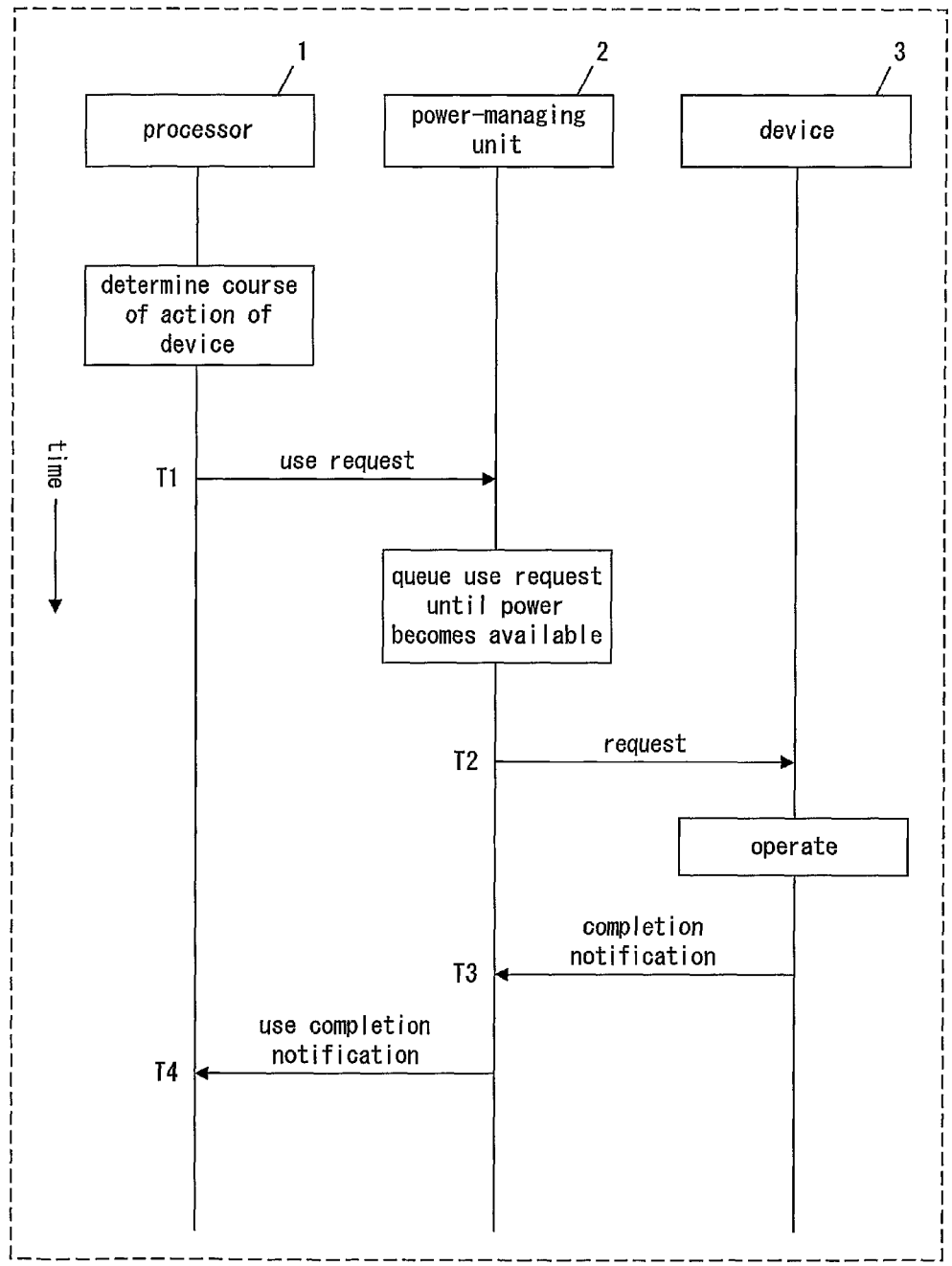
FIG. 21 is a diagram illustrating a control sequence of the prior art power consumption-managing apparatus.

The above discusses a sequence of control over the peak power of the electronic apparatus 100 according to the present embodiment. The sequence as described above is now compared with the prior art sequence of FIG. 21. According to the prior art, a course of action to be provided by a device 3 is determined when a request for the use of the device 3 is addressed. In contrast, the electronic apparatus 100 according to the present embodiment allows the peak power-managing unit 10 to send the use permit notification on the device 30 to the processor 20, and thereafter allows the processor 20 to determine the course of action of the device 30 in accordance with the most current information that is updated when the processor 20 is in receipt of the use permit notification on the device 30, whereby the determined course of action of the device 30 is set up.

FIG. 3 is an illustration showing exemplified peak power control according to the present embodiment. The following discusses, with reference to FIG. 3, a flow of the exemplified peak power control to be provided by the peak power-managing unit 10.

As illustrated by FIG. 3, the processor 20 in the electronic apparatus 100 is processing the three different threads "A", "B", and "C". Assume that the devices 30; 31, and 32 have the maximum power consumption values of 200, 300, and 400 mW, respectively. Assume that the electronic apparatus 100 has the maximum peak power consumption value (a value of maximum available electrical power) of 500 mW, which can be supplied to the devices 30-32 at a time.

To process the thread "A", at sequence No. 1, the processor 20 addresses a request for the use of the device 30 to the peak power-managing unit 10.

At sequence No. 2, the peak power-managing unit 10 in receipt of the request from the processor 20 determines whether it is allowable to add the power consumption value 200 mW of the device 30 to the current total power consumption value. In this event, the peak power-managing unit 10 determines that the power consumption value 200 mW of the device 30 is smaller than the maximum available power 500 mW in the absence of currently used power consumption value, and issues a use permit notification on the device 30 to the processor 20.

At sequence No. 3, the processor 20 in receipt of the use permit notification from the peak power-managing unit 10 starts using the device 30 in accordance with a course of action that is updated at that time, to treat the tread "A", and the device 30 is thereby activated. In FIG. 3, the devices in action are designated by hatched regions.

To treat the thread "B", at sequence No. 4, the processor 20 addresses a request for the use of the device 31 to the peak power-managing unit 10.

At sequence No. 5, the peak power-managing unit 10 in receipt of the request from the processor 20 determines whether it is allowable to further add the power consumption value 300 mW of the device 31 to the current total power consumption value. In this event, the peak power-managing unit 10 determines that the added total power consumption value 500 mW or a sum of the currently used power consumption value 200 mW and the power consumption value 300 mW of the device 31 still remains within the maximum available power 500 mW, and issues a use permit notification on the device 31 to the processor 20.

At sequence No. 6, the processor 20 in receipt of the use permit notification from the peak power-managing unit 10 starts using the device 31 in accordance with a course of action that is updated at that time, to treat the thread "B", and the device 31 is thereby activated.

To treat the thread "C", at sequence No. 7, the processor 20 addresses a request for the use of the device 32 to the peak power-managing unit 10.

At sequence No. 8, the peak power-managing unit 10 in receipt of the request from the processor 20 determines whether it is allowable to further add the power consumption value 400 mW of the device 32 to the current power consumption value. In this event, the peak power-managing unit 10 determines that the added total power consumption value 900 mW or a sum of the currently used power consumption value 500 mW and the power consumption value 400 mW of the device 32 is greater than the maximum available power 500 mW, and suspends the request for the use of the device 32 from the processor 20.

At sequence No. 9, the device 30 completes the course of action, and issues a completion notification to the processor 20. The processor 20 in receipt of the completion notification from the device 30 issues a notification of the completed use of the device 30 to the peak power-managing unit 10.

At sequence 10, the peak power-managing unit 10 in receipt of the notification of the completed use of the device 30 from the processor 20 subtracts the power consumption value 200 mW of the device 30 from the total power consumption value 500 mW, thereby providing the updated total power consumption value 300 mW. The peak power-managing unit 10 determines whether permission can be made to the suspended request for the use of the device 32. As a result, the peak power-managing unit 10 determines that the added total power consumption value 700 mW or a sum of the currently used power consumption value 300 mW and the power consumption value 400 mW of the device 32 is still greater than the maximum available power 500 mW, and continues to suspend the request for the use of the device 32.

At sequence No. 11, the device 31 completes the course of action, and issues a completion notification to the processor 20. The processor 20 in receipt of the completion notification from the device 31 issues a notification of the completed use of the device 31 to the peak power-managing unit 10.

At sequence 12, the peak power-managing unit 10 in receipt of the notification of the completed use of the device 31 from the processor 20 subtracts the power consumption value 300 mW of the device 31 from the total power consumption value 300 mW, thereby providing the updated total power consumption value 0 mW. The peak power-managing unit 10 determines whether permission can be made to the suspended request for the use of the device 32. As a result, the peak power-managing unit 10 determines that the power consumption value 400 mW of the device 32 remains within the maximum available power 500 mW in the absence of currently used power consumption value, and issues a use permit notification on the device 32 to the processor 20.

At sequence No. 13, the processor 20 in receipt of the use permit notification from the peak power-managing unit 10 starts using the device 32 in accordance with a course of action that is updated at that time, to process the thread "C", and the device 32 is thereby activated.

At sequence No. 14, the device 32 completes the course of action, and issues a completion notification to the processor 20. The processor 20 in receipt of the completion notification from the device 32 issues a notification of the completed use of the device 32 to the peak power-managing unit 10.

At sequence No. 15, the peak power-managing unit 10 in receipt of the notification of the completed use of the device 32 from the processor 20 subtracts the power consumption value 400 mW of the device 32 from the total power consumption value 400 mW, thereby providing the updated total power consumption value 0 mW.

Now, a sequence of the peak power control provided by the peak power-managing unit 10 is terminated.

Second Embodiment

Figure 4:
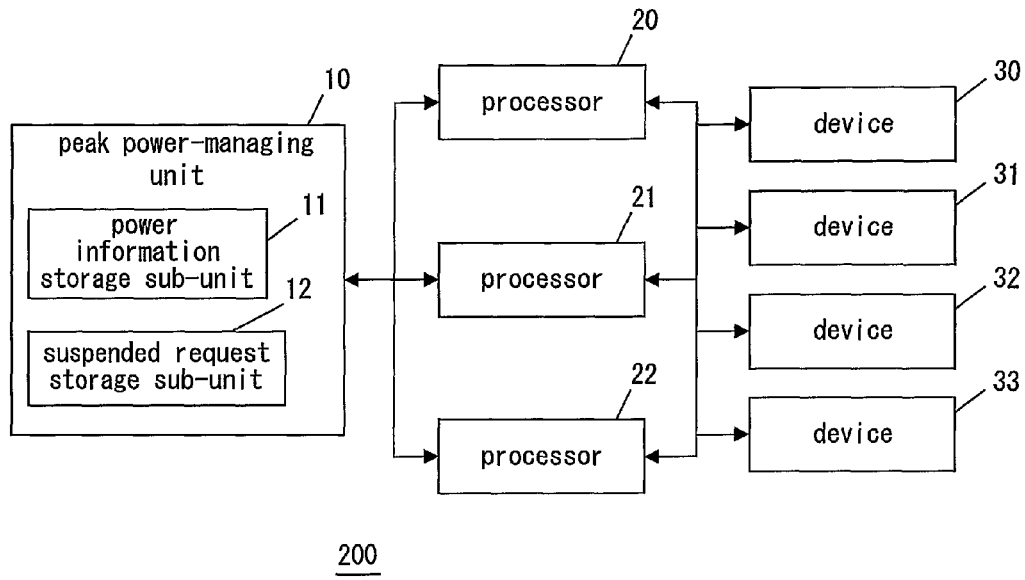
FIG. 4 is a block diagram illustrating an electronic apparatus according to a second embodiment.

FIG. 4 is a block diagram illustrating an electronic apparatus 200 according to a second embodiment. In FIG. 4, elements similar to those of FIG. 1 are identified by the same reference characters, and descriptions related thereto are herein omitted.

The electronic apparatus 200 according to the present embodiment includes processors 20, 21, and 22, devices 30, 31, 32, and 33, and a peak power-managing unit 10. Each of the processors 20, 21, and 22 serves as a master device, and can use any one of the devices 30-33. The peak power-managing unit 10 includes a power information storage sub-unit 11 operable to store electrical power information on the current power consumption value, and a suspended request storage sub-unit 12 operable to store suspended and unallowable device use requests from the processors.

Figure 5:
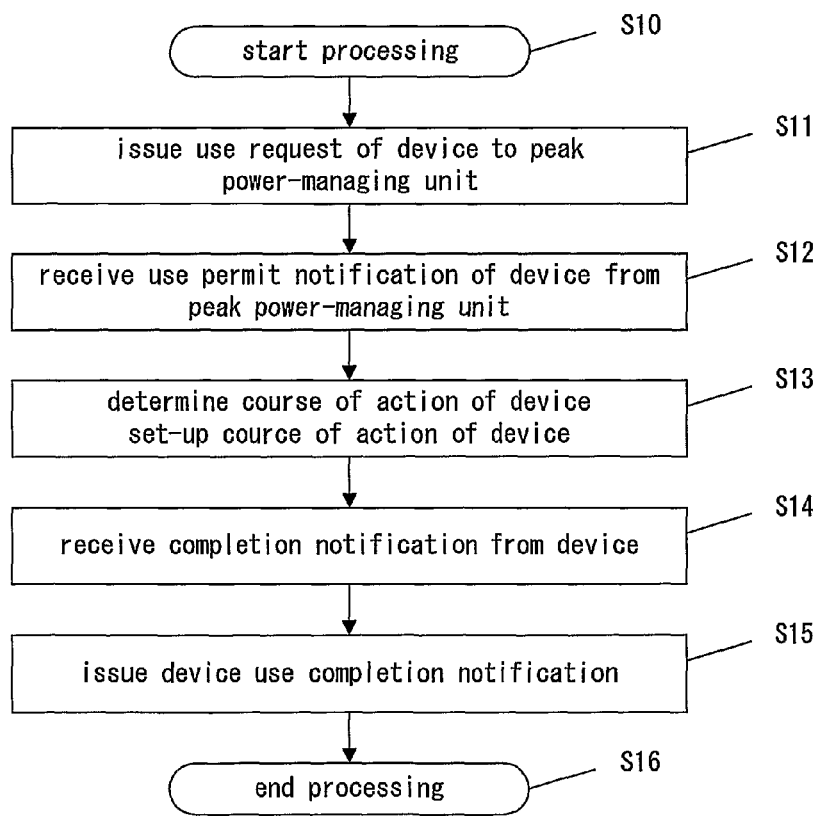
FIG. 5 is a flowchart illustrating a course of action provided by a processor according to the second embodiment.

FIG. 5 is a flowchart illustrating a course of action provided by the processor 20 according to the present embodiment. The following discusses, with reference to FIG. 5, the course of action provided by each of the processors in the electronic apparatus 200 according to the present embodiment.

At step S10, the present processing is started. At step S11, any one of the processors 20-22 (e.g., the processor 20) addresses, to the peak power-managing unit 10, a request for the use of any one of the devices 30-33 (e.g., the device 30). (Following step S11, the peak power-managing unit 10 in receipt of the request for the use of the device 30 from the processor 20 determines whether the device 30 is available, and then issues a use permit notification on the device 30 to the processor 22. Such a determination-related course of action provided by the peak power-managing unit 10 is described later in detail.)

At step S12, the processor 20 receives the use permit notification on the device 30.

At step S13, the processor 20 determines a course of action to be provided by the device 30 at that time, thereby establishing the determined course of action of the device 30. (Following step S13, the device 30 starts the established course of action. The device 30 issues a completion notification to the processor 20 when completing the course of action.)

At step S14, the processor 20 receives the completion notification from the device 30.

At step S15, the processor 20 issues, to the peak power-managing unit 10, a notification of the completed use of the device 30. At step S16, the present processing is terminated.

(Following step S15, the peak power-managing unit 10 treats suspended use requests upon receipt of the notification of the completed use of the device 30 from the processor 20. Details of the treatment are discussed later.)

Figure 6:
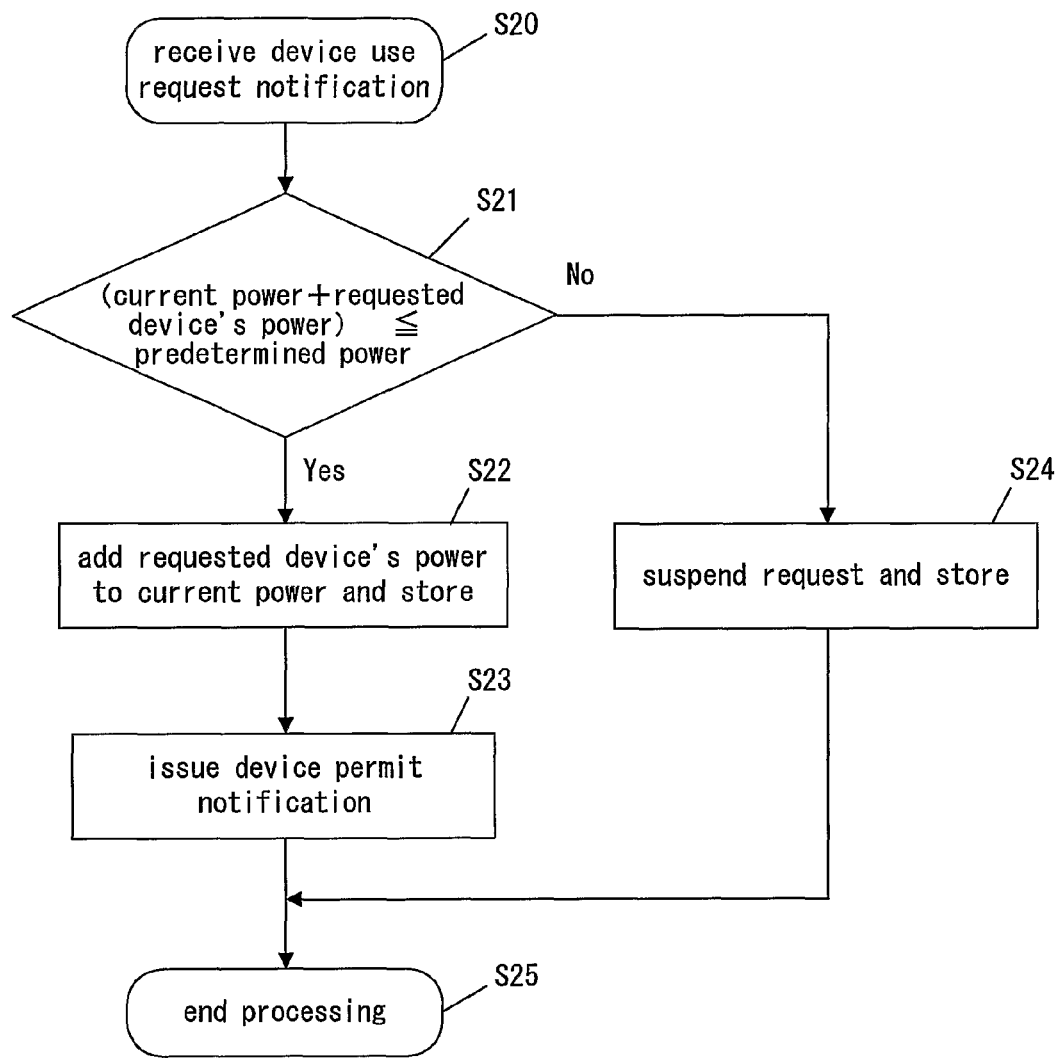
FIG. 6 is a flowchart illustrating a course of action provided by a peak power-managing unit according to the second embodiment.

FIG. 6 is a flowchart illustrating a course of action provided by the peak power-managing unit 10 according to the present embodiment. FIG. 6 illustrates how the peak power-managing unit 10 is operated following the above-described step S11 of FIG. 5 in which the peak power-managing unit 10 is in receipt of the request for the use of the device 30 from the processor 20.

Referring to FIG. 6, at step S20, the peak power-managing unit 10 is shown receiving a notification of the request for the use of the device 30 from the processor 20.

At step S21, the peak power-managing unit 10 determines, with reference to the current total power consumption value stored in the power information storage sub-unit 11, whether when the power consumption value of the target device 30 to be used by the processor 20 is added to the current total power consumption value, the added total power consumption value still remains within a predetermined specified value or the maximum available power. When the determination in step S21 results in "YES" or that the added total power consumption value still remains within the predetermined specified value, then the routine is advanced to step S22, but is moved to step S24 when the determination results in the contrary or "NO".

At step S22, the peak power-managing unit 10 adds the power consumption value of the device 30 to the current total power consumption value, thereby providing updated total power consumption value, and then stores the updated total power consumption value in the power information storage sub-unit 11.

At step S23, the peak power-managing unit 10 issues a use permit notification on the device 30 to the processor 20. The routine is advanced to step S25, at which the present processing is terminated.

Meanwhile, at step S24, the peak power-managing unit 10 suspends the request for the use of the device 30 from the processor 20 in response to the negative result from the determination in step S21, and then stores the suspended request for the use of the device 30 as a suspended request in the suspended request storage sub-unit 12. The routine is advanced to step S25, at which the present processing is terminated.

Figure 7:
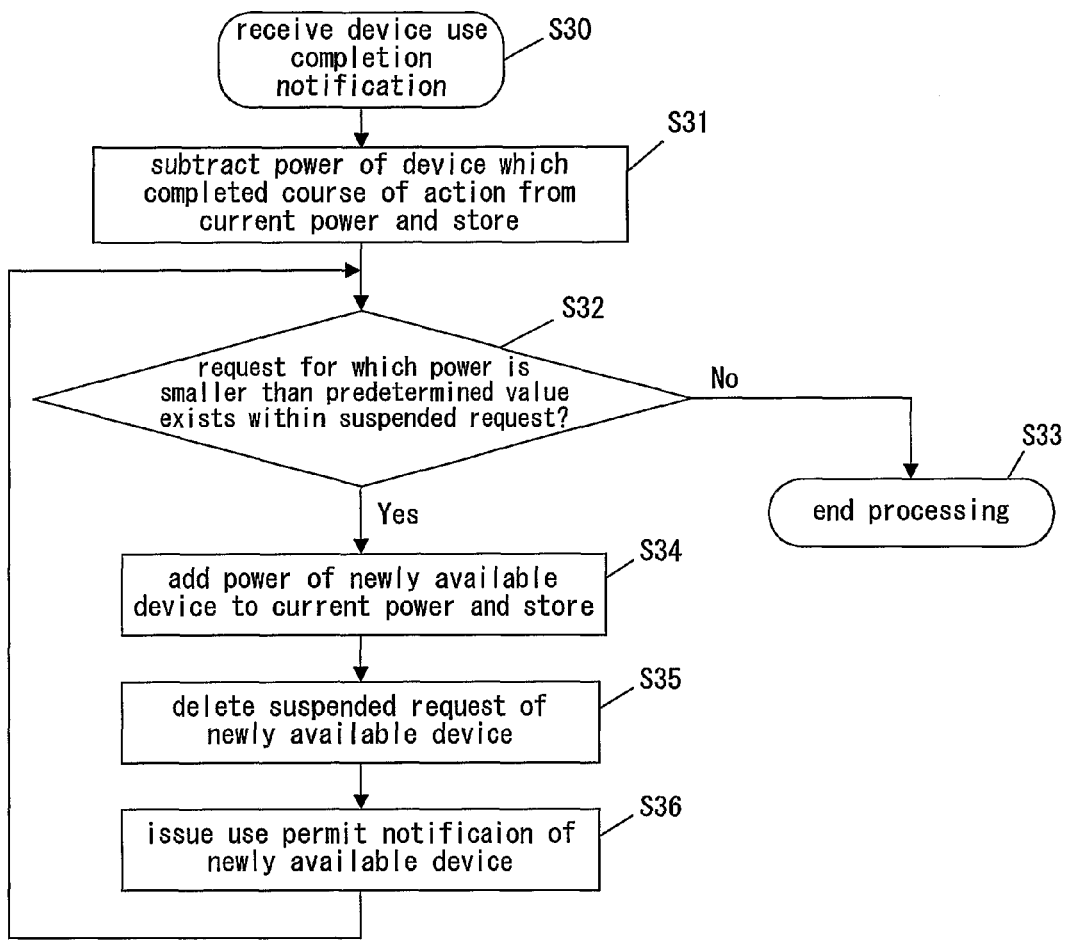
FIG. 7 is a flowchart illustrating another course of action provided by the peak power-managing unit according to the second embodiment.

FIG. 7 is a flowchart illustrating another course of action provided by the peak power-managing unit 10 according to the present embodiment. The flowchart of FIG. 7 illustrates how the peak power-managing unit 10 is operated following the above-described step S15 of FIG. 5 in which the peak power-managing unit 10 is in receipt of the notification of the completed use of the device 30 from the processor 20.

Referring to FIG. 7, at step S30, the peak power-managing unit 10 is shown receiving a notification of the completed use of the device 30 from the processor 20.

At step S31, the peak power-managing unit 10 subtracts the power consumption value of the device 30 having its course of action completed, from the current total power consumption value stored in the power information storage sub-unit 11, thereby providing updated total power consumption value, and then stores the updated total power consumption value in the power information storage sub-unit 11.

At step S32, the peak power-managing unit 10 searches for one or more suspended requests stored in the suspended request storage sub-unit 12, in the order in which they are stored therein, and then determines, with reference to the updated total power consumption value stored in the power information storage sub-unit 11, whether when a device related to one of the suspended requests as searched for is now operated, an added total power consumption value still remains within the maximum available power. When the determination in step S32 results in "NO" or that the added total power consumption value is greater than the maximum available power, then the routine is advanced to step S33, at which the present processing is terminated. Conversely, when the determination in step S32 results in the contrary or "YES", the routine is advanced to step S34, and the searched suspended request-related device as discussed above is newly available.

At step S34, the peak power-managing unit 10 adds the power consumption value of the newly available device to the current total power consumption value stored in the power information storage sub-unit 11, thereby providing updated total power consumption value, and then stores the updated total power consumption value in the power information storage sub-unit 11.

At step S35, the peak power-managing unit 10 deletes the suspended request for the newly available device from the suspended request storage sub-unit 12.

At step S36, the peak power-managing unit 10 issues a use permit notification on the newly available device to one of the processors, by which a request for the use of the newly available device was addressed.

The routine is returned to step S32, at which the peak power-managing unit 10 checks for suspended requests related to the other devices ready for use under the updated total power consumption value.

As described above, the electronic apparatus 200 including several processors and several devices according to the present embodiment allows each of the devices to be operated while always limiting the peak power of the entire apparatus to at most a specified value.

Third Embodiment

Figure 8:
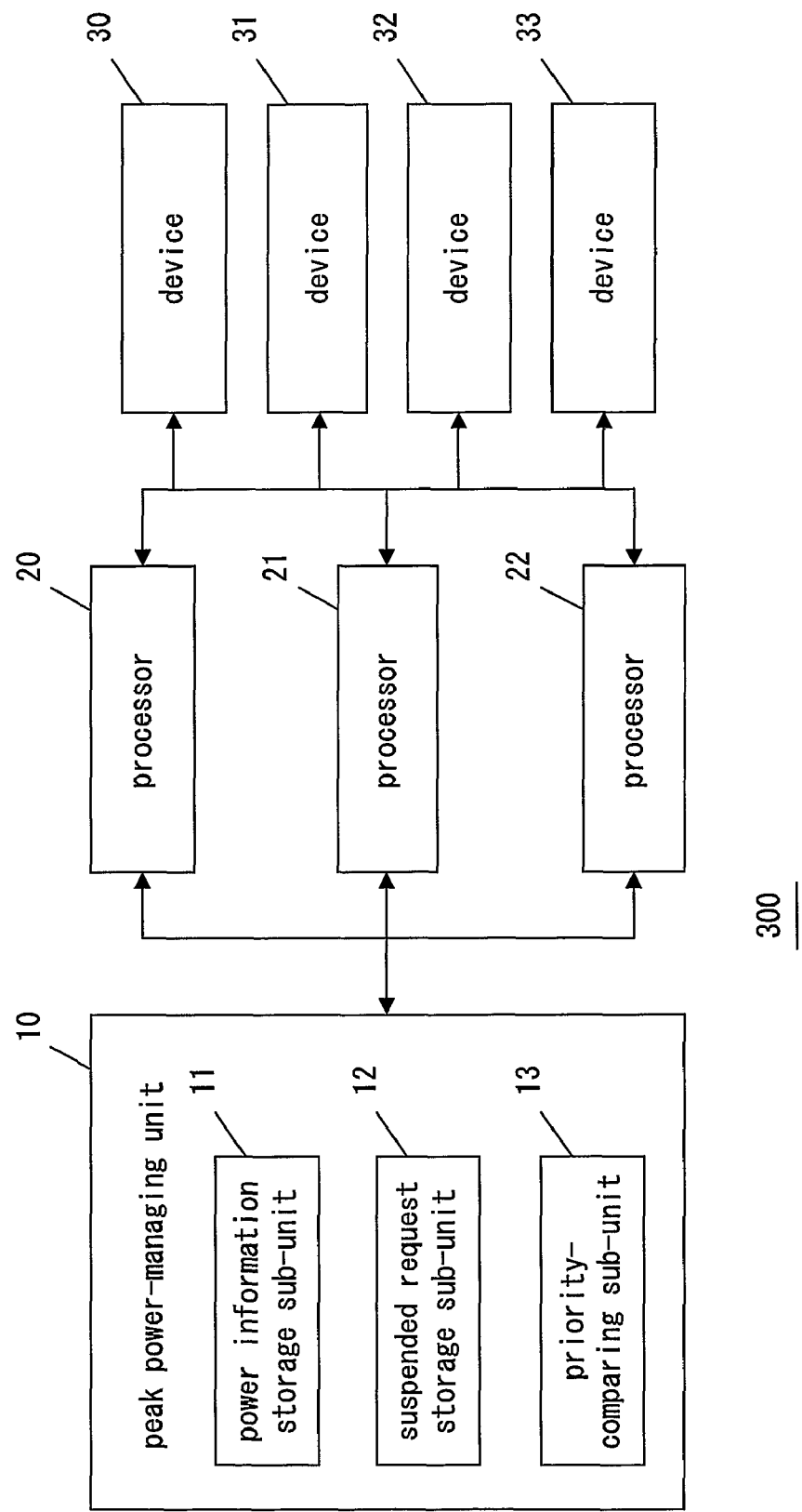
FIG. 8 is a block diagram illustrating an electronic apparatus according to a third embodiment.

FIG. 8 is a block diagram illustrating an electronic apparatus 300 according to a third embodiment. In FIG. 8, elements similar to those of FIG. 1 or FIG. 4 are identified by the same reference characters, and descriptions related thereto are herein omitted.

The electronic apparatus 300 according to the present embodiment includes processors 20, 21, and 22, devices 30, 31, 32, and 33, and a peak power-managing unit 10. Each of the processors 20-22 acts as a master device, and can use any one of the devices 30-33. The peak power-managing unit 10 includes a power information storage sub-unit 11, a suspended request storage sub-unit 12, and a priority-comparing sub-unit 13. The priority-comparing sub-unit 13 is operable to determine the order in which suspended requests are searched for, on the basis of a piece of priority information added to a use request notification on each of the devices.

In the electronic apparatus 300 according to the present embodiment, when addressing a request for the use of any one of the devices 30-33, each of the processors 20-22 issues a use request notification containing priority information on the target device to the peak power-managing unit 10. The priority information shows priority in which the target device is preferentially used. The peak power-managing unit 10 manages a corresponding suspended use request in accordance with the use request notification containing priority information.

The electronic apparatus 300 according to the present embodiment is substantially the same as the electronic apparatus 200 according to the second embodiment in terms of the way in which the entire processing is executed, except for the way in which the suspended use requests are treated.

More specifically, the electronic apparatus 300 according to the present embodiment is operated, in accordance with the flowchart of FIG. 5, in a manner similar to the electronic apparatus 200 according to the second embodiment; however, a request for the use of one of the devices 30-33 as addressed by each of the processors 20-22 is provided with the priority information indicative of the priority as to the preferential use of a target device to be used by one of the processors.

Upon receipt of the request for the use of any one of the devices 30-33 from each of the processors 20-22, the peak power-managing unit 10 provides, in accordance with the flowchart of FIG. 6, a course of action similar to the peak power-managing unit 10 according to the second embodiment, thereby treating the device use requests from the processors 20-22.

The electronic apparatus 300 according to the present embodiment is characterized by the way of treating suspended use requests. The following discusses a characteristic course of action provided by the electronic apparatus 300 according to the present embodiment, with reference to a course of action provided by the priority-comparing sub-unit 13.

Figure 9:
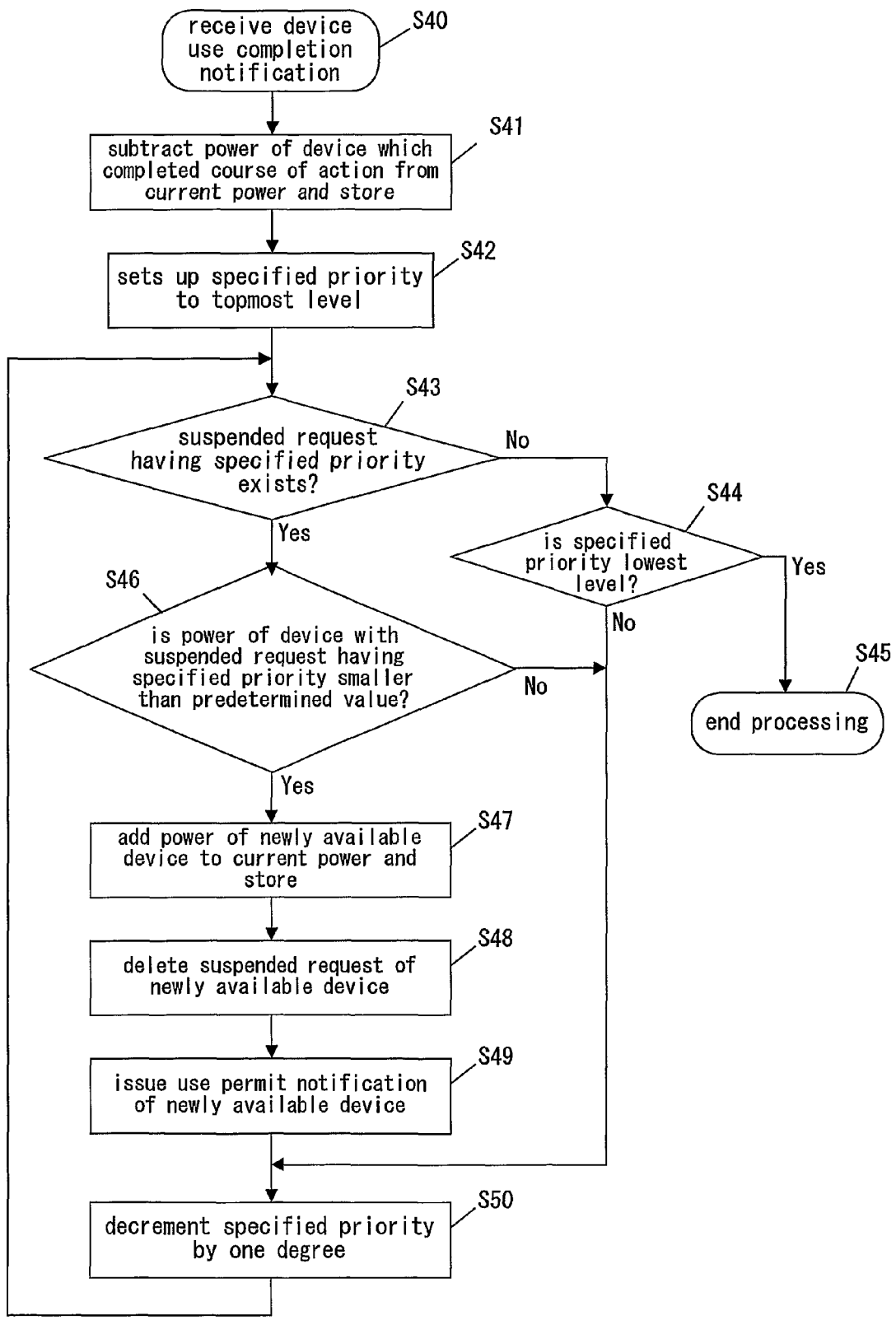
FIG. 9 is a flowchart illustrating a course of action provided by a peak power-managing unit according to the third embodiment.

FIG. 9 is a flowchart illustrating a course of action provided by the peak power-managing unit 10 according to the present embodiment. The flowchart of FIG. 9 illustrates how the peak power-managing unit 10 is operated following the previously described step S15 of FIG. 5 in which the peak power-managing unit 10 is in receipt of a notification of the completed use of the device 30 from the processor 20.

Referring to FIG. 9, at step S40, the peak power-managing unit 10 is shown receiving the notification of the completed use of the device 30 from the processor 20.

At step S41, the peak power-managing unit 10 subtracts the power consumption value of the device 30 having its course of action completed, from the current total power consumption value stored in the power information storage sub-unit 11, thereby providing updated total power consumption value, and then stores the updated total power consumption value in the power information storage sub-unit 11.

At step S42, the peak power-managing unit 10 sets up specified priority to a topmost level.

At step S43, the peak power-managing unit 10 determines, with reference to the suspended request storage sub-unit 12, whether there is present a suspended request having the specified priority or the highest priority in this instance. When the determination in step S43 results in "NO" or that such a suspended request is absent, then the routine is moved to step S44, but is advanced to step S46 when the determination in step S43 results in the contrary or "YES".

At step S44, the priority-comparing sub-unit 13 determines whether the specified priority is the lowest in level. When the determination in step S44 results in "YES" or that the specified priority is the lowest in level, then the routine is advanced to step S45, at which the present processing is terminated. Conversely, when the determination in step S44 results in the contrary or "NO", then the routine is advanced to step S50.

At step S46, the peak power-managing unit 10 determines the availability of a device related to the suspended request having the specified priority, which is stored in the suspended request storage sub-unit 12. More specifically, the peak power-managing unit 10 determines, with reference to the current total power consumption value stored in the power information storage sub-unit 11, whether when the specified priority-related device as discussed above is now operated, the added total power consumption value still remains within the maximum available power. When the determination in step S46 results in "NO" or that the added total power consumption value is greater than the maximum available power, then the routine is advanced to step S50, but is moved to step S47 when the determination in step S46 results in the contrary or "YES", and the specified priority-related device as discussed above is newly available.

At step S47, the peak power-managing unit 10 adds the power consumption value of the newly available device to the current total power consumption value, thereby providing updated total power consumption value, and then stores the updated total power consumption value in the power information storage sub-unit 11.

At step S48, the peak power-managing unit 10 deletes the suspended request for the use of the newly available device from the suspended request storage sub-unit 12.

At step S49, the peak power-managing unit 10 issues a use permit notification on the newly available device to one of the processors, by which a request for the use of the newly available device was made.

At step S50, the peak power-managing unit 10 decrements the specified priority by one degree. The routine is then returned to step S43, thereby repeating the processing from step S43 to step S50.

As a result, the peak power-managing unit 10 searches for available devices in descending order of the device use priority until using up the sufficient power consumption value that is rendered available when the peak power-managing unit 10 is in receipt of the notification of the completed device use in step S40.

As described above, the electronic apparatus 300 including several processors and several devices according to the present embodiment allows for the preferential use of higher-priority devices while always limiting the peak power of the entire apparatus to at most a specified value.

As a result, a determination can uniquely be made in accordance with a specified peak power value or the maximum available power, as to the maximum queuing time that elapses from the moment when a request for the use of the highest-priority device is made, up to the moment when the highest-priority device is ready for use. The maximum queuing time with reference to a request for the use of a second higher-priority device is uniquely determinable based on both a queuing time with reference to the request for the use of the highest-priority device, and device control time in which the request for the use of the highest-priority device is fulfilled. A similar determination is uniquely made to the maximum queuing time with reference to a request for the use of each of third higher- and fourth higher-priority devices. In conclusion, the electronic apparatus 300 provides guaranteed real time.

Although the electronic apparatus 300 according to the present embodiment makes a priority comparison upon receipt of the notification of the completed use of each of the devices, there is an alternative manner in which, when the device use requests are suspended, the priority-comparing unit 13 may store and sort the priority of each of the suspended requests. This alternative corresponds to implementation as general prioritized queues when the peak power-managing unit 10 is fabricated by software.

Fourth Embodiment

Figure 10:
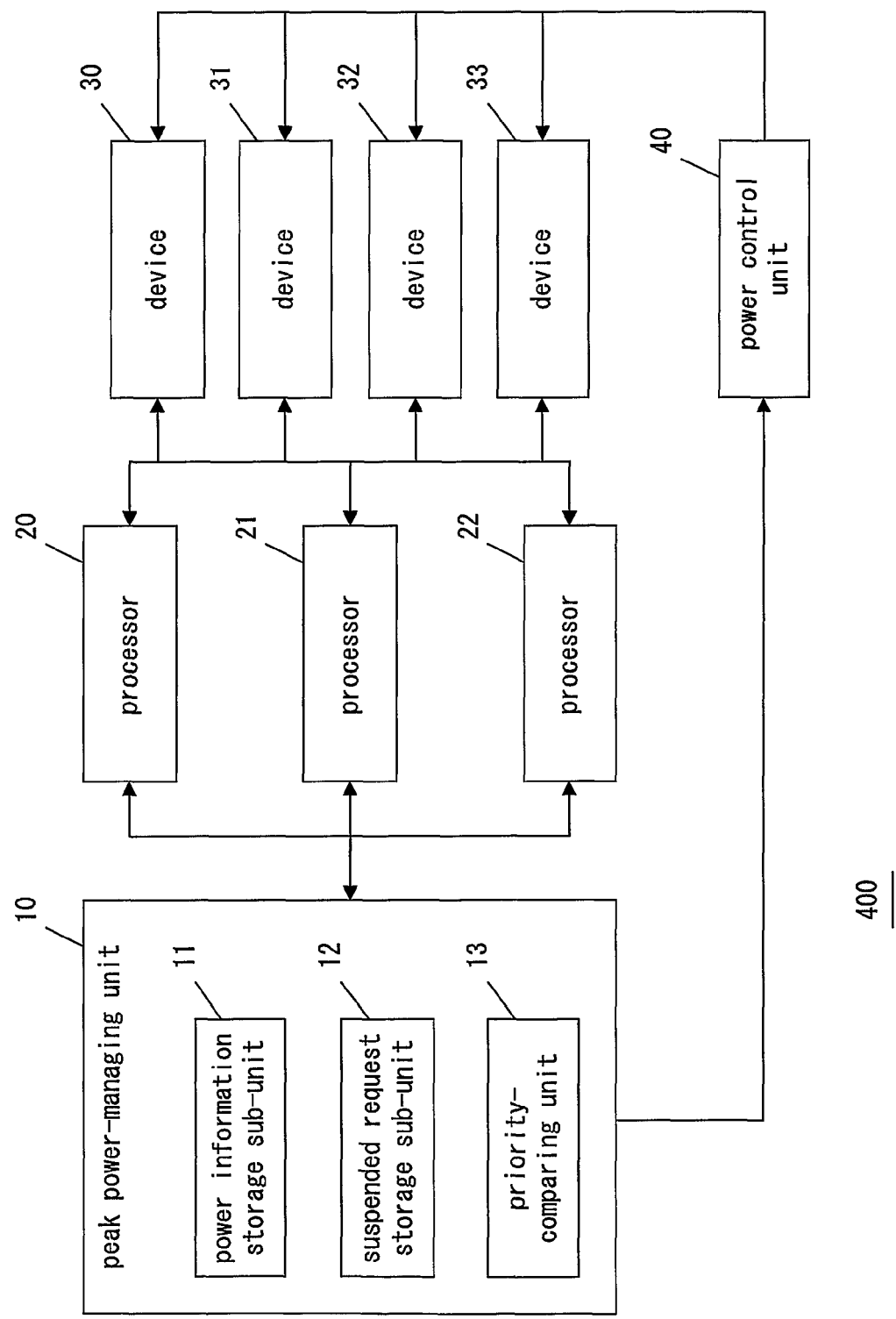
FIG. 10 is a block diagram illustrating an electronic apparatus according to a fourth embodiment.

FIG. 10 is a block diagram illustrating an electronic apparatus 400 according to a fourth embodiment. In FIG. 10, elements similar to those of FIG. 1 or FIG. 8 are identified by the same reference characters, and descriptions related thereto are herein omitted.

The electronic apparatus 400 according to the present embodiment includes processors 20, 21, and 22, devices 30, 31, 32, and 33, a peak power-managing unit 10, and a power control unit 40. The peak power-managing unit 10 includes a power information storage sub-unit 11, a suspended request storage sub-unit 12, and a priority-comparing sub-unit 13.

The power control unit 40 has control of the power consumption of each of the devices 30-33 in response to instructions from the peak power-managing unit 10. More specifically, the power control unit 40 is operable to control at least one of a clock frequency, electrical power, and electrical current, all of which are supplied to each of the device 30-33, thereby having control of the power consumption of each of the devices 30-33.

In the electronic apparatus 400 according to the present embodiment, each of the processors 20-22 is operable to issue a use request notification containing priority information on any one of the devices 30-33 to the peak power-managing unit 10 before using such a target device to be used by each of the processors. The priority information shows priority in which the target one of the devices 30-33 is preferentially used. The peak power-managing unit 10 manages a use request in accordance with the use request notification containing priority information.

Now, assume that any one of the processors 20-22 (e.g., the processor 20) issues, to the peak power-managing unit 10, a notification that requests the use of any one of the devices 30-33 (e.g., the device 30).

Figure 11:
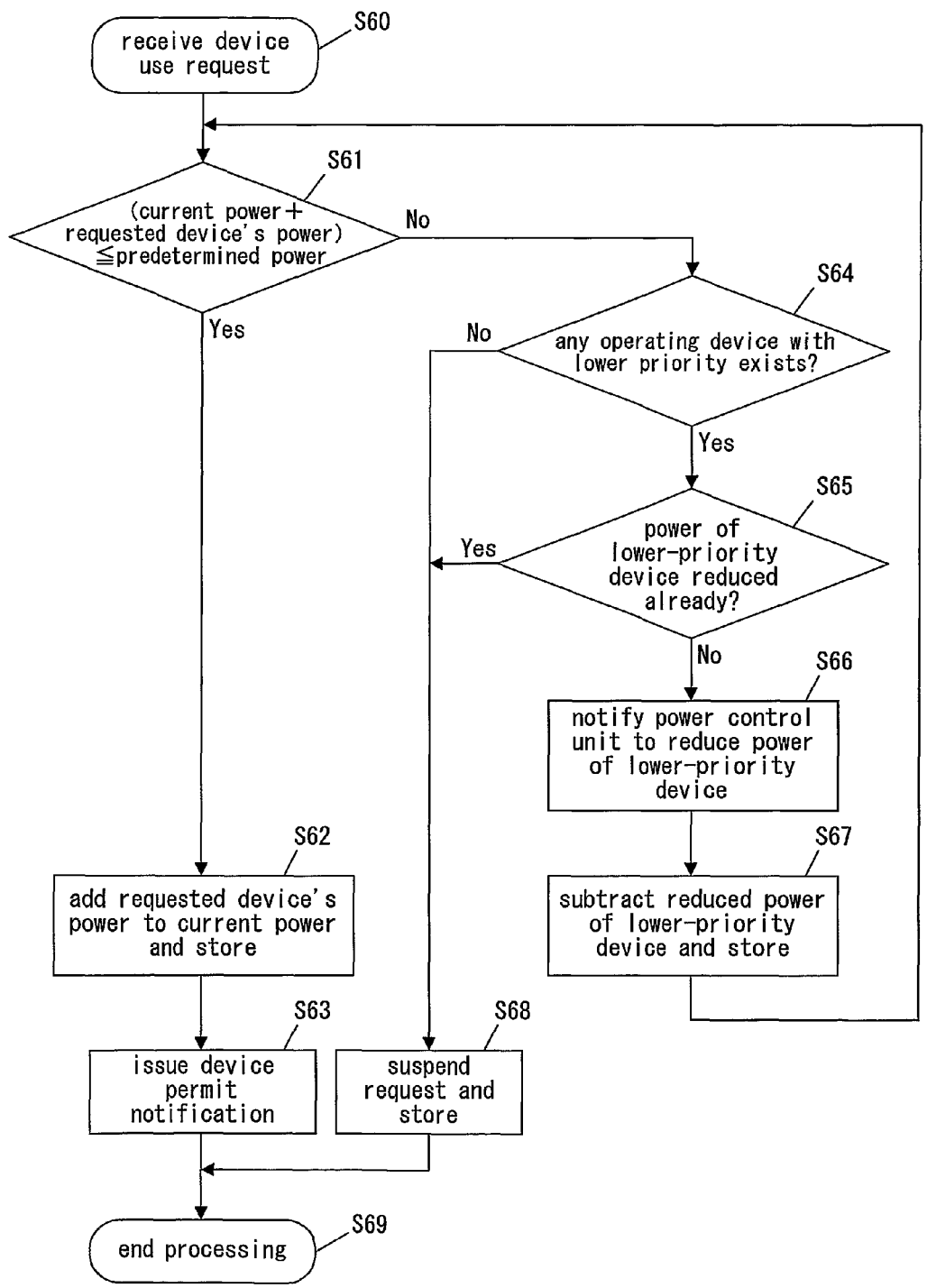
FIG. 11 is a flowchart illustrating a course of action provided by a peak power-managing unit according to the fourth embodiment.

The peak power-managing unit 10 manages the peak power of the electronic apparatus 400 in accordance with the flowchart of FIG. 11. The flowchart of FIG. 11 illustrates a course of action provided by the peak power-managing unit 10 according to the present embodiment. The following discusses, with reference to the flowchart of FIG. 11, how the peak power-managing unit 10 according to the present embodiment is operated.

At step S60, the peak power-managing unit 10 is in receipt of a request for the use of the device 30 from the processor 20.

At step S61, the peak power-managing unit 10 determines, with reference to the current total power consumption value stored in the power information storage sub-unit 11, whether when the power consumption value of the target device 30 to be used by the processor 20 is added to the current total power consumption value, the added total power consumption value still remains within a predetermined specified value or the maximum available power. When the determination in step S61 results in "YES" or that the added total power consumption value remains within the predetermined specified value, then the routine is advanced to step S62, but is moved to step S64 when the determination in step S61 results in the contrary or "NO".

At step S62, the peak power-managing unit 10 adds the power consumption value of the device 30 to the current total power consumption value, thereby providing updated total power consumption value, and then stores the updated total power consumption value in the power information storage sub-unit 11.

At step S63, the peak power-managing unit 10 issues a use permit notification on the device 30 to the processor 20. The routine is advanced to step S69, at which the present processing is terminated.

Meanwhile, at step S64, the peak power-managing unit 10 in receipt of the negative result from the determination in step S61 determines, with reference to priority information included in the request for the use of the device 30, whether there is present one of currently operating devices, which is, as permitted by the priority-comparing unit 13, prioritized less than the priority of the device 30. When the determination in step S64 results in "YES" or that such a lower-priority device is present, then the routine is advanced to step S65, but is moved to step S68 when the determination in step S64 results in the contrary or "NO".

At step S65, the peak power-managing unit 10 determines whether the lower-priority device as permitted by the priority-comparing unit 13 has already been reduced in electrical power. When the determination in step S65 results in "YES" or that that the lower-priority device has already been reduced in electrical power, then the routine is advanced to step S68, but is moved to step S66 when the determination in step S65 results in the contrary or "NO".

At step S66, the peak power-managing unit 10 sends out a signal to the power control unit 40, and the power control unit 40 is thereby authorized to reduce the power consumption value of the lower-priority device.

At step S67, the peak power-managing unit 10 subtracts the reduced power consumption value of the lower-priority device, as practiced by the power control unit 40 in step S66, from the current total power consumption value, thereby providing updated total power consumption value, and then stores the updated total power consumption value in the power information storage sub-unit 11. The routine is returned to step S61.

At step S68, the peak power-managing unit 10 suspends the request for the use of the device 30, which has been unsatisfied in view of the priority of the device 30, and then stores the suspended request for the use of the device 30 as a suspended request in the suspended request storage sub-unit 12. The routine is advanced to step S69, at which the present processing is terminated.

When the routine is returned to step S61 following step S66 in which the power consumption value of the lower-priority device is reduced, then at step S61, the peak power-managing unit 10 re-determines, with reference to the updated total power consumption value stored in the power information storage sub-unit 11, whether the request for the use of the device 30 is satisfied. When the re-determination in step S61 results in "YES" or that the updated total power consumption value remains within the predetermined specified value, then the routine is advanced to step S62, and the peak power-managing unit 10 practices the processing in each of steps S62 and S63. Conversely, when the re-determination in step S61 results in "NO" or that the updated total power consumption value is greater than the predetermined specified value, then the routine is advanced to step S64, at which the peak power-managing unit 10 searches for any further lower-priority device in operation.

As described above, at step S66, the power control unit 40 reduces the power consumption value of the lower-priority device as permitted by the priority-comparing unit 13. At this time, the power control unit 40 reduces a clock frequency of the lower-priority device by way of reducing the power consumption value of the lower-priority device. As a result, the lower-priority device is reduced in processing speed, and is sometimes stopped in operation, with a consequential reduction in performance of the lower-priority device. At the sacrifice of the lower-priority device, the entire apparatus is reduced in power consumption, and a higher-priority, target device can be permitted to run.

Figure 12:
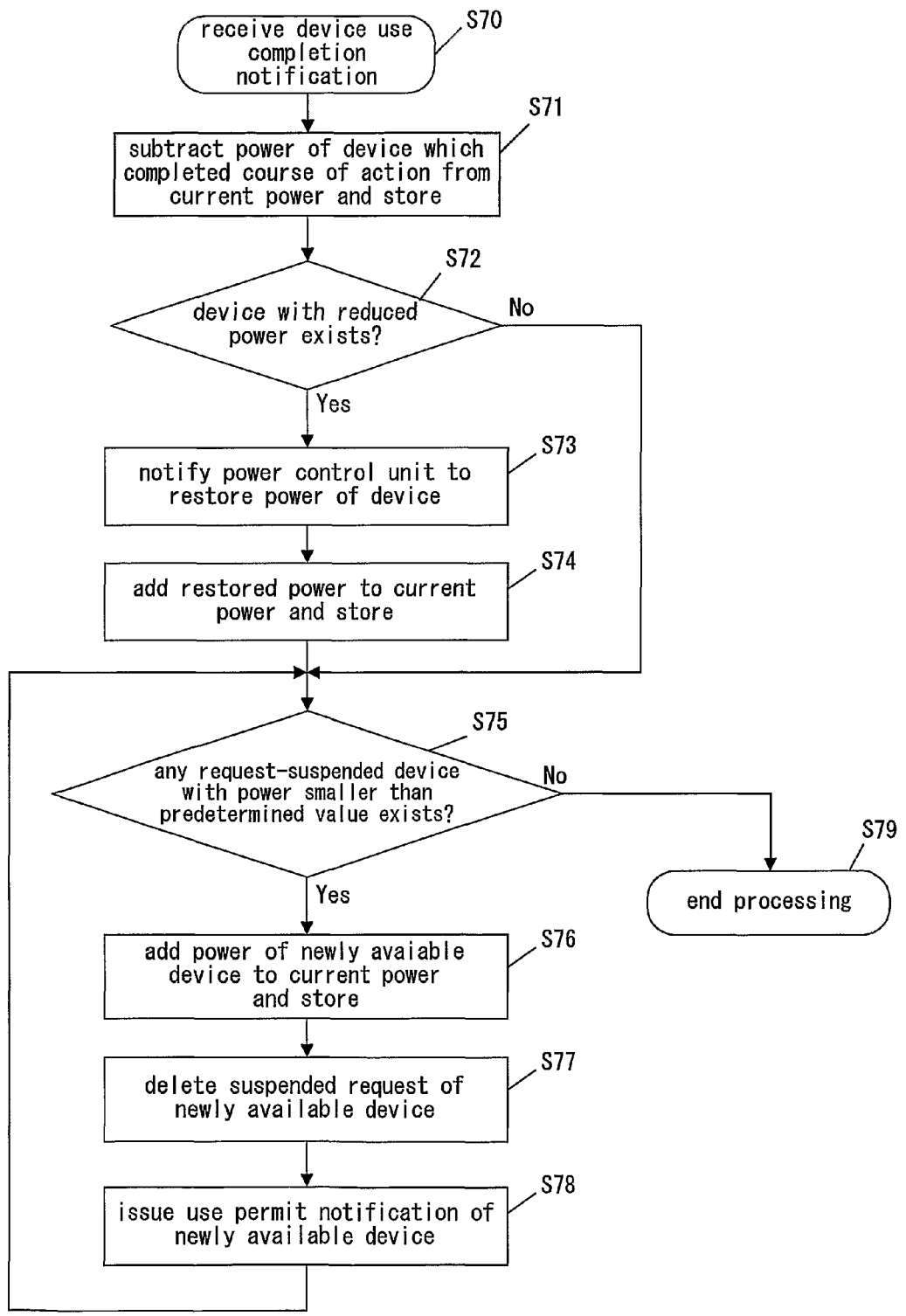
FIG. 12 is a flowchart illustrating another course of action provided by the peak power-managing unit according to the fourth embodiment.

FIG. 12 is a flowchart illustrating another course of action provided by the peak power-managing unit 10 according to the present embodiment, showing how the peak power-managing unit 10 is operated after receiving a notification of the completed use of the device 30 from the processor 20.

Referring to FIG. 12, at step S70, the peak power-managing unit 10 is shown receiving the notification of the completed use of the device 30 from the processor 20.

At step S71, the peak power-managing unit 10 subtracts the power consumption value of the device 30 having its course of action completed, from the total power consumption value stored in the power information storage sub-unit 11, thereby providing updated total power consumption value, and stores the updated total power consumption value in the power information storage sub-unit 11.

At step S72, the peak power-managing unit 10 determines whether there is present any device having power consumption decreased to operate the device 30. When the determination in step S72 results in "NO" or that the device having the power consumption reduced is absent, then the routine is advanced to step S75, but is moved to step S73 when the determination in step S72 results in the contrary or "YES".

At step S73, the peak power-managing unit 10 notifies the power control unit 40 to restore the power consumption value of the device having the electric power reduced. The power control unit 40 restores the power consumption value of that particular device in response to the notification from the peak power-managing unit 10.

At step S74, the peak power-managing unit 10 adds the restored power consumption value to the total power consumption value stored in the power information storage sub-unit 11, thereby providing updated total power consumption value, and then stores the updated total power consumption value in the power information storage sub-unit 11. The routine is advanced to step S75.

At step S75, the peak power-managing unit 10 searches, in order of priority, for suspended requests stored in the suspended request storage sub-unit 12, and then determines, with reference to the updated total power consumption value stored in the power information storage sub-unit 11, whether there is present any one of devices related to the suspended requests, whereby the operation of such a device still maintains the added total power consumption value within a predetermined specified value or the maximum available power. When the determination in step S75 results in "NO" or that there is absent such a device as to maintain the added total power consumption value within the predetermined specified value, then the routine is advanced to step S79, at which the present processing is terminated. Conversely, when the determination in step S75 results in the contrary or "YES", the routine is advanced to step S76, and the searched device as discussed above is newly available.

At step S76, the peak power-managing unit 10 adds the power consumption value of the newly available device to the total power consumption value stored in the power information storage sub-unit 11, thereby providing updated total power consumption value, and then stores the updated total power consumption value in the power information storage sub-unit 11.

At step S77, the peak power-managing unit 10 deletes the newly available device-related suspended request from the suspended request storage sub-unit 12.

At step S78, the peak power-managing unit 10 issues a use permit notification on the newly available device to any one of the processors, by which a request for the use of the newly available device was made.

The routine is returned to step S75, at which the peak power-managing unit 10 checks for another suspended request for a further device available under the updated total power consumption value.

As described above, the electronic apparatus 400 according to the present embodiment reduces the processing speed of a lower-priority processing-adapted device to allow a higher-priority processing-adapted device to start a course of processing. As a result, reduced maximum queuing time for higher-priority processing is achievable, and any processing accompanied by more severe real-time constraints is executable.

The electronic apparatus 400 according to the present embodiment is constructed to restore the power consumption value of the device having the power consumption value reduced, when completing the use of the higher-priority processing-adapted device. The electronic apparatus 400 will become simpler in construction, if the way of restoring the power consumption value is alternatively omitted.

Although the electronic apparatus 400 according to the present embodiment is constructed to reduce the power consumption value of the lower-priority processing-adapted device in order to make it possible to use the higher-priority processing-adapted device, conversely the lower-priority processing-adapted device may temporarily be increased in power consumption. In the converse case, a device having the power consumption temporarily increased by increasing a clock frequency thereof is possible to complete ongoing processing faster. As a result, reduced maximum queuing time for the higher-priority processing is achievable.

Fifth Embodiment

Figure 13:
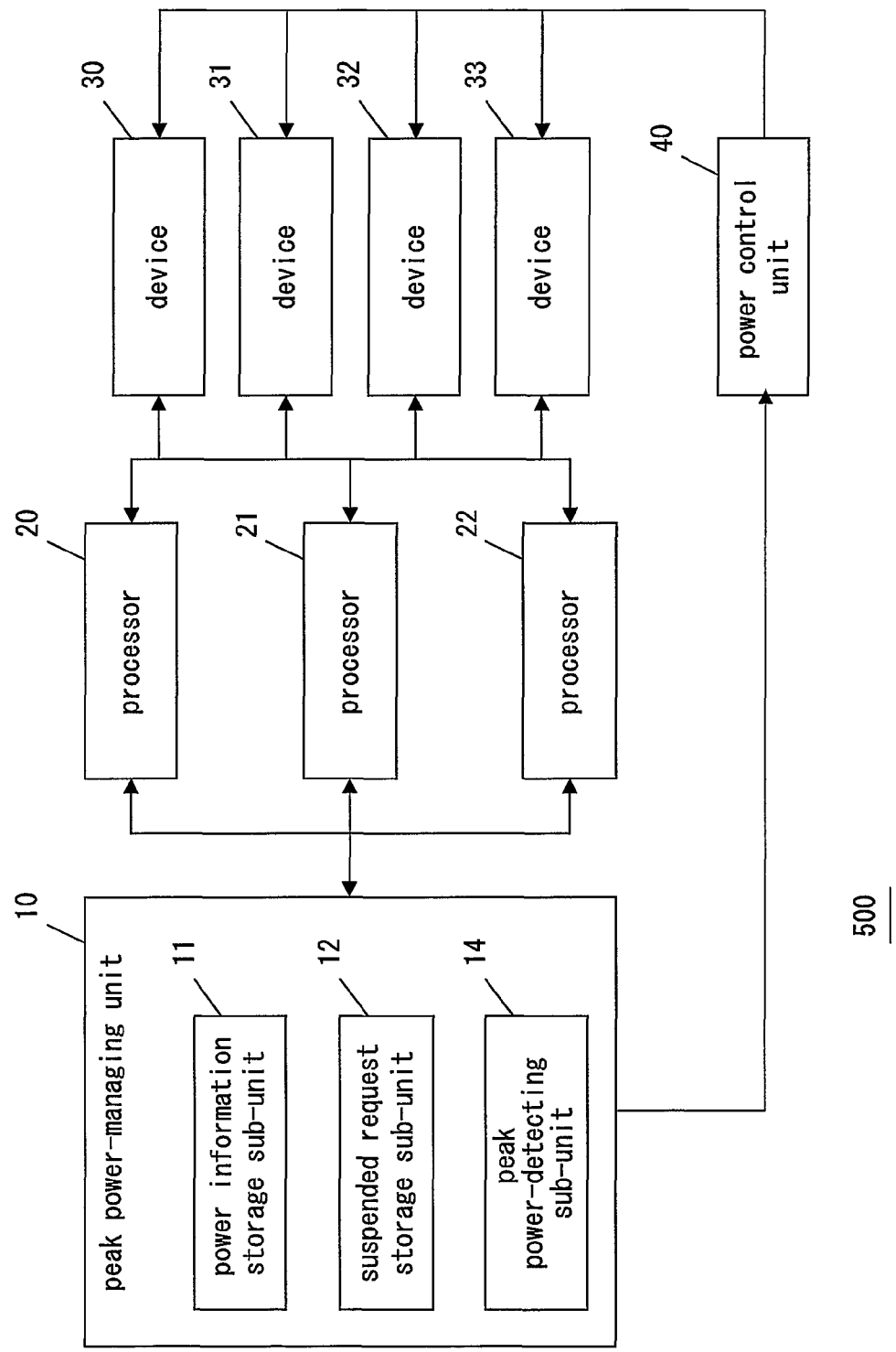
FIG. 13 is a block diagram illustrating an electronic apparatus according to a fifth embodiment.

FIG. 13 is a block diagram illustrating an electronic apparatus 500 according to a fifth embodiment. In FIG. 13, elements similar to those of FIG. 1 or FIG. 10 are identified by the same reference characters, and descriptions related thereto are herein omitted.

The electronic apparatus 500 according to the present embodiment includes processors 20, 21, and 22, devices 30, 31, 32, and 33, a peak power-managing unit 10, and a power control unit 40. Each of the processors 20-22 acts as a master device, and can use any one of the devices 30-33. The peak power-managing unit 10 according to the present embodiment includes a power information storage sub-unit 11, a suspended request storage sub-unit 12, and a peak power-detecting sub-unit 14.

The peak power-detecting sub-unit 14 included in the peak power-managing unit 10 according to the present embodiment is operable to always measure the power consumption value of each of the devices 30-33 and that of each of other elements in the electronic apparatus 500. The power information storage sub-unit 11 always stores results from the measurement. The peak power-detecting sub-unit 14 is operable to issue a warning when measuring that the total power consumption value of the devices 30-33 is greater than the maximum available power.

When the peak power-detecting sub-unit 14 issues a warning, the peak power-managing unit 10 cuts down on the power consumption of any one of the devices 30-33 through the power control unit 40.

As a result, the electronic apparatus 500 according to the present embodiment allows the maximum power consumption value to be controlled to constantly remain within a predetermined value.

The electronic apparatus 500 according to the present embodiment is designed to feed the measurement results to the outside from the peak power-detecting sub-unit 14, whereby the peak power of the electronic apparatus 500 can be monitored. The use of results from the monitoring makes it feasible to estimate the peak power of each of the devices in further detail, and useful information on design is available.

Sixth Embodiment

Figure 14:
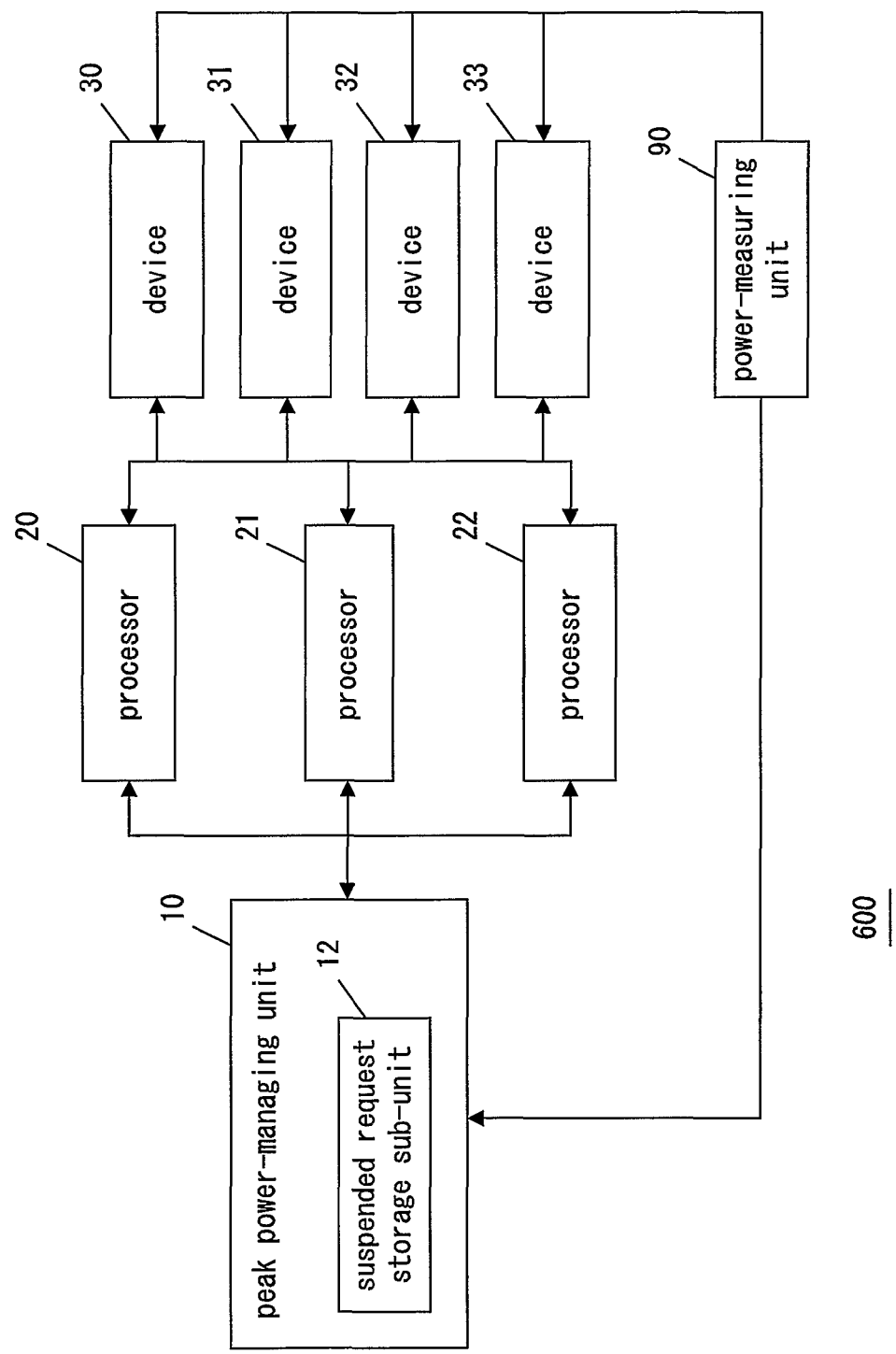
FIG. 14 is a block diagram illustrating an electronic apparatus according to a sixth embodiment.

FIG. 14 is a block diagram illustrating an electronic apparatus according to a sixth embodiment. The electronic apparatus 600 includes processors 20, 21, and 22, devices 30, 31, 32, and 33, a peak power-managing unit 10, and a power-measuring unit 90 operable to measure a power consumption value of each of the devices 30-33. Each of the processors 20-22 acts as a master device, and can use any one of the devices 30-33. The peak power-managing unit 10 includes a suspended request storage sub-unit 12. The suspended request storage sub-unit 12 is operable to store unallowable and suspended device use requests from the processors.

The electronic apparatus 600 according to the present embodiment has the power-measuring unit 90 substituted for the power information storage sub-unit 11. The power-measuring unit 90 is operable to measure the power consumption value of each of the devices 30-33, and to notify the peak power-managing unit 10 of results from the measurement. As a result, the peak power-managing unit 10 is able to recognize, in real time, the power consumption value of each of the devices 30-33.

Figure 15:
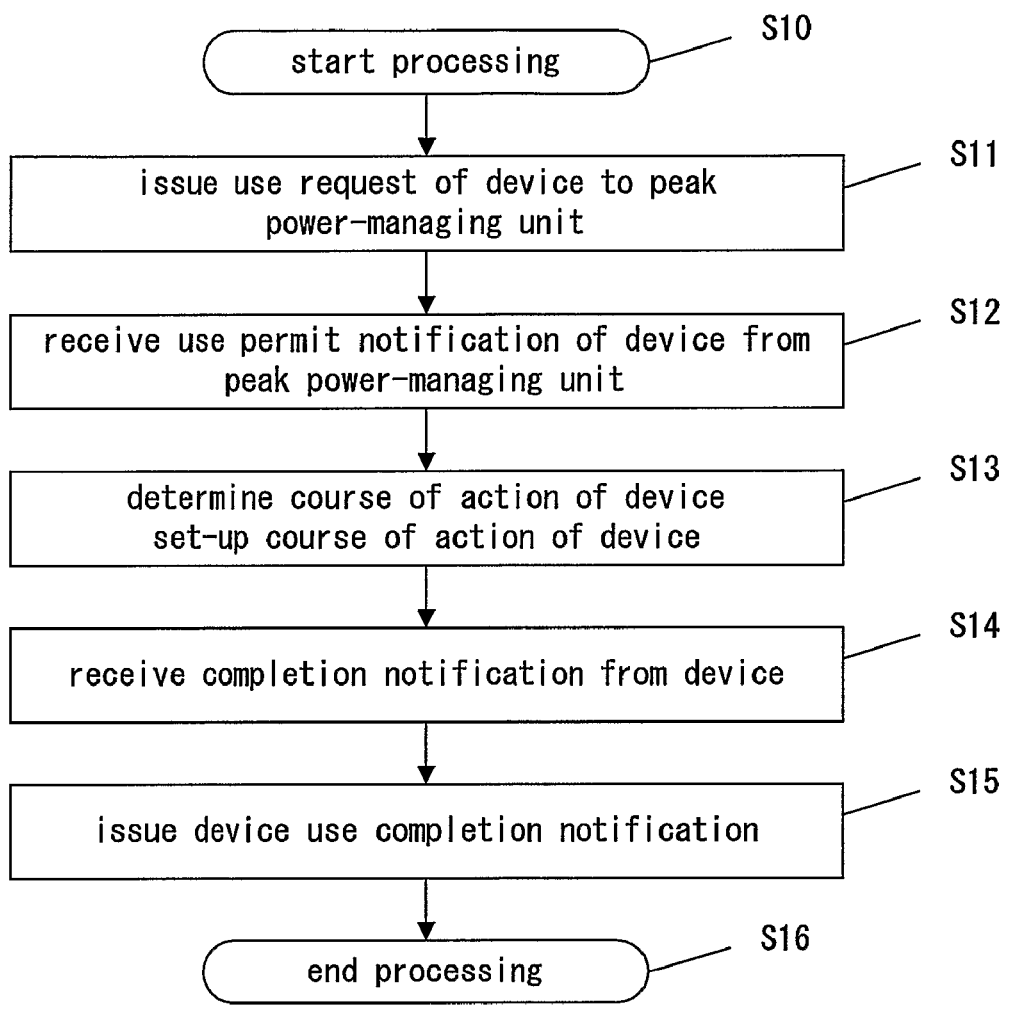
FIG. 15 is a flowchart illustrating a course of action provided by each processor according to the sixth embodiment.

FIG. 15 is a flowchart illustrating a course of action provided by each of the processors according to the present embodiment. The following discusses, with reference to FIG. 15, how the processor 20 is operated.

At step S10, the present processing is started.

At step S11, any one of the processors 20-22 (e.g., the processor 20) issues, to the peak power-managing unit 10, a request for the use of any one of the devices 30-33 (e.g., the device 30). Following step S1, the peak power-managing unit 10 determines whether the device 30 is available, upon receipt of the request for the use of the device 30 from the processor 20, and then issues a use permit notification on the device 30 to the processor 20. A determination-related course of action provided by the peak power-managing unit 10 is discussed later in detail.

At step S12, the processor 20 receives the use permit notification on the device 30.

At step S13, the processor 20 in receipt of the use permit notification determines a course of action to be provided by the device 30 at that time, thereby setting up the determined course of action of the device 30. Following the set-up of the determined course of action in step S13, the device 30 starts the course of action. When completing the course of action, the device 30 issues a completion notification to the processor 20.

At step S14, the processor 20 is in receipt of the completion notification from the device 30.

At step S15, the processor 20 in receipt of the completion notification from the device 30 issues, to the peak power-managing unit 10, a notification of the completed use of the device 30. At step S16, the present processing is terminated.

Following step S15, the peak power-managing unit 10 treats suspended use requests upon receipt of the notification of the completed use of the device 30 from the processor 20. The treatment is discussed later in detail.

Figure 16:
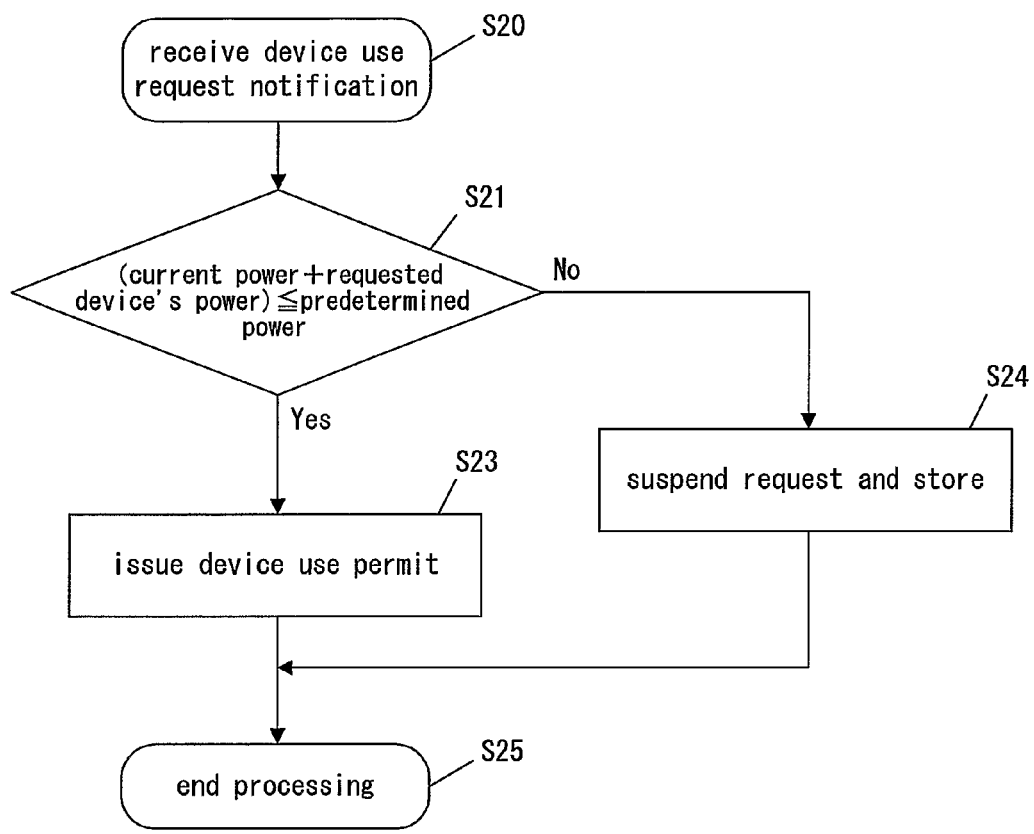
FIG. 16 is a flowchart illustrating a course of action provided by a peak power-managing unit according to the sixth embodiment.

The following discusses in detail, with reference to FIG. 16, a determination-related course of action provided by the peak power-managing unit 10 following step S11 of FIG. 15.

FIG. 16 is a flowchart illustrating a course of action provided by the peak power-managing unit according to the present embodiment. FIG. 16 illustrates a flow of determination-related action of the peak power-managing unit 10 following step S11 of FIG. 15.

At step S20, the peak power-managing unit 10 receives a use request notification on the device 30 from the processor 20.

At step S21, the peak power-managing unit 10 adds a power consumption value of the target device 30 to be used by the processors 20, to the current power consumption value received from the power-measuring unit 90, thereby providing an added total power consumption value, and then compares the added total power consumption value with a predetermined power value or, e.g., the maximum available power. The comparison is made to determine whether the added total power consumption value is equal to or smaller than the predetermined power value. When the determination in step S21 results in "YES" or that the added total power consumption value is equal to or smaller than the predetermined power value, then the routine is advanced to step S23, but is moved to step S24 when the determination in step S21 results in the contrary or "NO".

When the added total power consumption value is equal to or smaller than the predetermined power value, then at step S23, the peak power-managing unit 10 issues a use permit notification on the device 30 to the processor 20. After the issuance of the use permit notification, the present processing is terminated at step 25.

Conversely, when the added total power consumption value is greater than the predetermined power value, then at step S24, the peak power-managing unit 10 suspends the request for the use of the device 30. The suspended use request is stored in the suspended request storage sub-unit 12.

Figure 17:
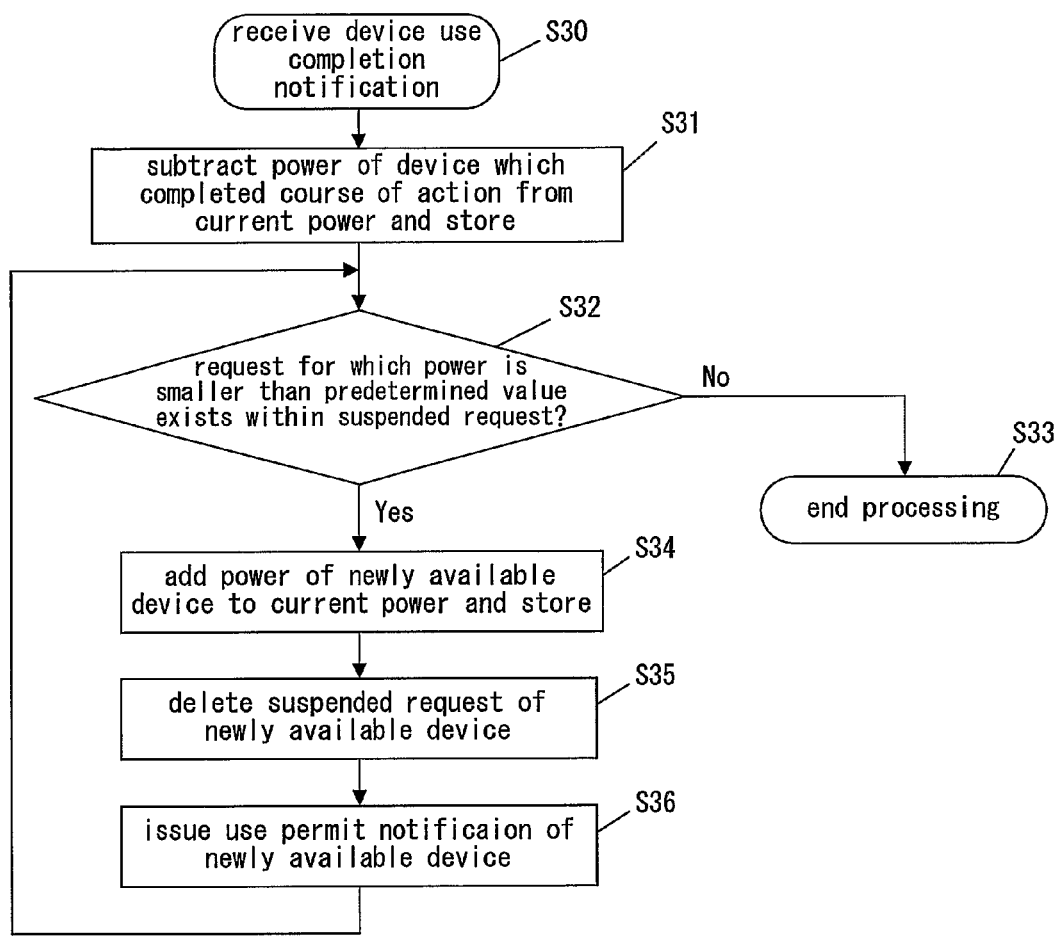
FIG. 17 is a flowchart illustrating another course of action provided by the peak power-managing unit according to the sixth embodiment.

The following discusses, with reference to FIG. 17, how the peak power-managing unit 10 is operated at step S15 of FIG. 15.

FIG. 17 is a flowchart illustrating another course of action provided by the peak power-managing unit according to the present embodiment.

At step S30, the peak power-managing unit 10 receives a notification of the completed use of the device 30 from the processor 20.

At step S31, the peak power-managing unit 10 subtracts a power consumption value of the device 30 having its course of action completed, from the current total power consumption value stored in the power information storage sub-unit 11, thereby providing an updated total power consumption value, and then stores the updated total power consumption value in the power information storage sub-unit 11.

At step S32, the peak power-managing unit 10 searches for one or more suspended requests stored in the suspended request storage sub-unit 12, in order in which they are stored therein, with reference to the updated total power consumption value stored in the power information storage sub-unit 11. The peak power-managing unit 10 determines whether, when a device related to one of the suspended requests searched as above is operated, an added total power consumption value still remains within the maximum available power. When the determination in step S32 results in "NO" or that the added total power consumption value is greater than the maximum available power, then the routine is advanced to step S33, at which the present processing is terminated. Conversely, when the determination in step S32 results in the contrary or "YES", the routine is advanced to step S34, and the device related to one of the suspended requests as discussed above is newly available.

At step S34, the peak power-managing unit 10 adds a power consumption value of the newly available device to the current total power consumption value stored in the power information storage sub-unit 11, thereby providing an updated total power consumption value, and then stores the updated total power consumption value in the power information storage sub-unit 11.

At step S35, the peak power-managing unit 10 deletes the newly available device-related suspended request from the suspended request storage sub-unit 12.

At step S36, the peak power-managing unit 10 issues a use permit notification on the newly available device to one of the processors, by which a request for the use of the newly available device was addressed.

The routine is returned to step S32, at which the peak power-managing unit 10 repeats the course of processing following step 32, thereby executing processing according to a course of action to be provided by a further newly available device.

It is preferred that the peak power-managing unit 10 optionally includes a priority-comparing unit to compare the priority of a target device, which addressed a use request, with the priority of another device in action before the peak power-managing unit 10 issues a device use permit notification on either one of the devices.

For example, assuming that the target device is placed ahead of an operating device, it is preferred that the operating device is interrupted in operation to issue a use permit notification to the target device. The operating device is, of course, allowed to continue running when being placed ahead of the target device.

Alternatively, when the target device is placed ahead of the operating device, it is also preferred that the operating device is reduced in power consumption to issue a use permit notification to the target device. At this time, the power consumption of the operating device is decreased by at least one of a reduction in clock frequency, a reduction in power voltage, and clock gating.

When several device use requests are stored in the suspended request storage sub-unit 12, then the peak power-managing unit 10 desirably determines the availability of several devices in descending order of the priority of the use requests.

Alternatively, the peak power-managing unit 10 desirably issues use permit notifications on the several devices in descending order of the priority of the use requests. At this time, when an added total power consumption value reached by a use request from any one of the devices is greater than a predetermined power value, then the suspended request storage sub-unit 12 stores the use request from that particular device.

As described above, the electronic apparatus 600 including several processors and several devices according to the present embodiment allows each of the devices to be operated while always limiting the peak power of the entire electronic apparatus to at most a specified value. In addition, the electronic apparatus 600 including several processors and several devices according to the present embodiment is possible to have appropriate control of the peak power, even if the power consumption of the electronic apparatus is varied according to different device individuals that occurred in mass production of the electronic apparatus.

In particular, the electronic apparatus 600 including several processors and several devices according to the present embodiment is provided with the power-measuring unit 90, thereby updating electrical power values in real time, and electrical power is controllable within finer limits.

Seventh Embodiment

A seventh embodiment is now described with reference to FIG. 18. In an electronic apparatus according to the present embodiment, a peak power-managing unit 10 provides a course of action in accordance with an electrical power-related, residual quantity-managing unit 51. A battery unit 50 houses the residual quantity-managing unit 51.

Figure 18:
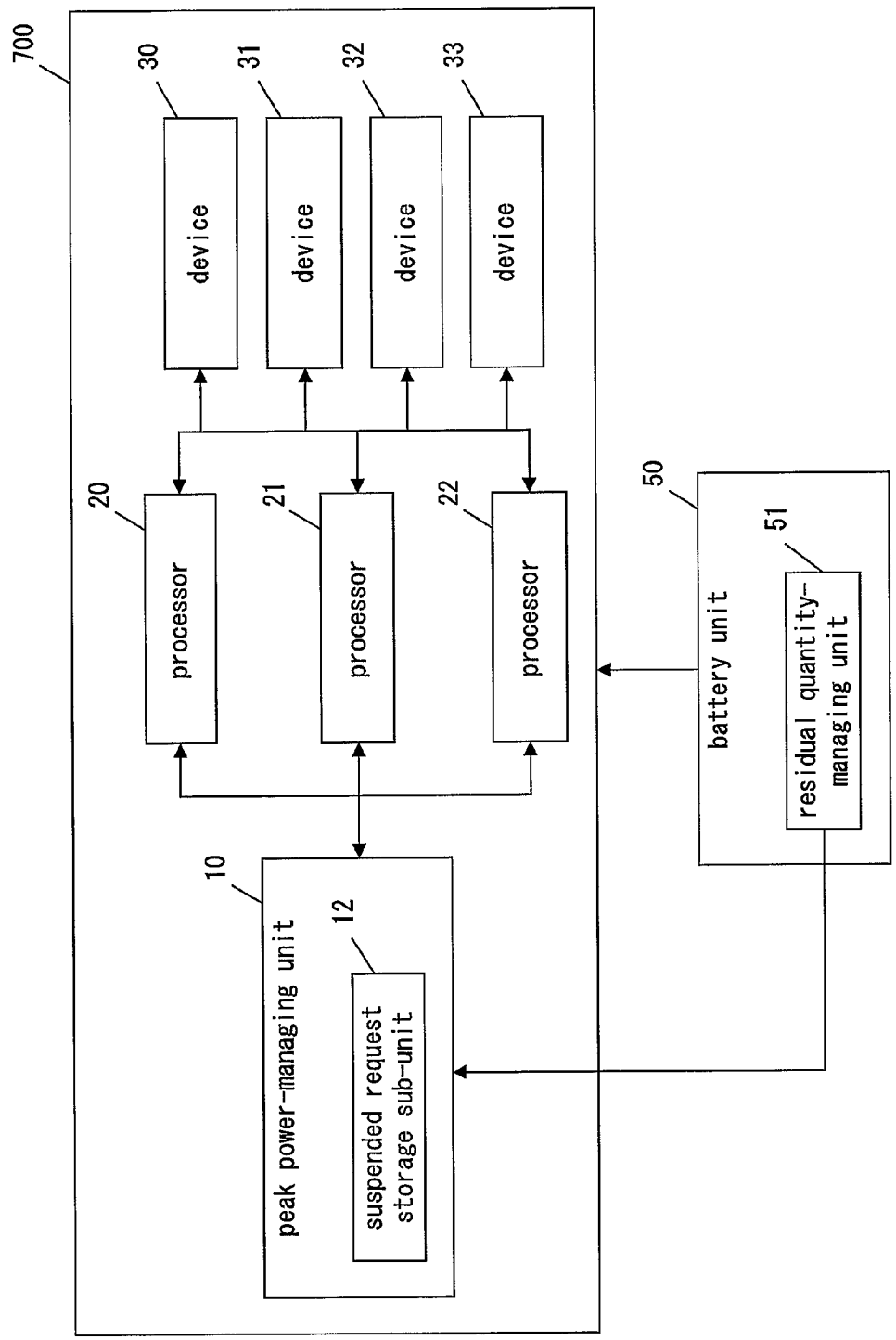
FIG. 18 is a block diagram illustrating an electronic apparatus according to a seventh embodiment.

FIG. 18 is a block diagram illustrating the electronic apparatus according to the present embodiment. Referring to FIG. 18, the electronic apparatus 700 is shown connected to the battery unit 50.

The battery unit 50 is electrically connected to the electronic apparatus 700.

The electronic apparatus 700 includes processors 20, 21, and 22, devices 30, 31, 32, and 33, and the peak power-managing unit 10. Each of the processors 20, 21, and 22 acts as a master device, and can use any one of the devices 30-33. The peak power-managing unit 10 includes a suspended request storage sub-unit 12.

The battery unit 50 is operable to accumulate physical or chemical energy to supply electrical power to partially or wholly the electronic apparatus 700.

The residual quantity-managing unit 51 is operable to supply the peak power-managing unit 10 with information on momentary maximum electrical power ready for output.

The use of, e.g., a lithium ion secondary battery or otherwise a NiCd battery as the battery unit 50 varies a value of electrical power ready for output, depending upon residual electrical power quantity. The use of a fuel battery similarly varies a value of electrical power ready for output, depending upon, e.g., temperature conditions.

In light of the above, the residual quantity-managing unit 51 notifies the peak power-managing unit 10 of the residual electrical power quantity, while managing the residual quantity, whereby the peak power-managing unit 10 accurately recognizes a remaining electrical power value of the battery unit 50.

Similarly to the sixth embodiment, when receiving a use request from each of the devices 30-33, the peak power-managing unit 10 compares the residual power value notified by the residual quantity-managing unit 51 with a total power consumption value, thereby determining whether permission can be made as to the use of each of the devices 30-33. This processing allows each of the devices 30-33 to be operated within the maximum power value of the battery unit 50. In short, the electronic apparatus 700 is possible to continue running without an interruption in power supply of the electrical power.

It is preferred that the peak power-managing unit 10 optionally includes a priority-comparing unit to compare the priority of a target device, which addressed a use request, with the priority of another device in operation, thereby issuing a use permit notification on either one of the devices.

For example, assuming that the target device is preferred in priority over an operating device, it is desirable that the operating device is interrupted in operation to issue a use permit notification to the target device. The operating device is, of course, allowed to continue operating when being preferred in priority over the target device.

Alternatively, when the target device is preferred in priority over the operating device, it is also desirable that the operating device is reduced in power consumption to issue a use permit notification to the target device. At this time, the power consumption of the operating device is decreased by at least one of a reduction in clock frequency, a reduction in power voltage, and clock gating.

When several device use requests are stored in the suspended request storage sub-unit 12, then the peak power-managing unit 10 desirably determines the availability of several devices in descending order of the priority of the use requests.

Alternatively, the peak power-managing unit 10 desirably issues a use permit notification on the several devices in descending order of the priority of the use requests. At this time, when an added total power consumption value reached by a use request from any one of the devices is greater than a predetermined power value, then the suspended request storage sub-unit 12 stores the use request from that particular device.

As described above, the residual power value of the battery unit 50 is used as an allowable total power value when the use permit is determined in accordance with the priority, and an accurate determination is made.

Eighth Embodiment

An eighth embodiment is now described with reference to FIG. 19.

When an operating device is to be interrupted in operation, an electronic apparatus according to the present embodiment is operable to issue instructions to a thread that activated the operating device, to interrupt the device from operating.

Figure 19:
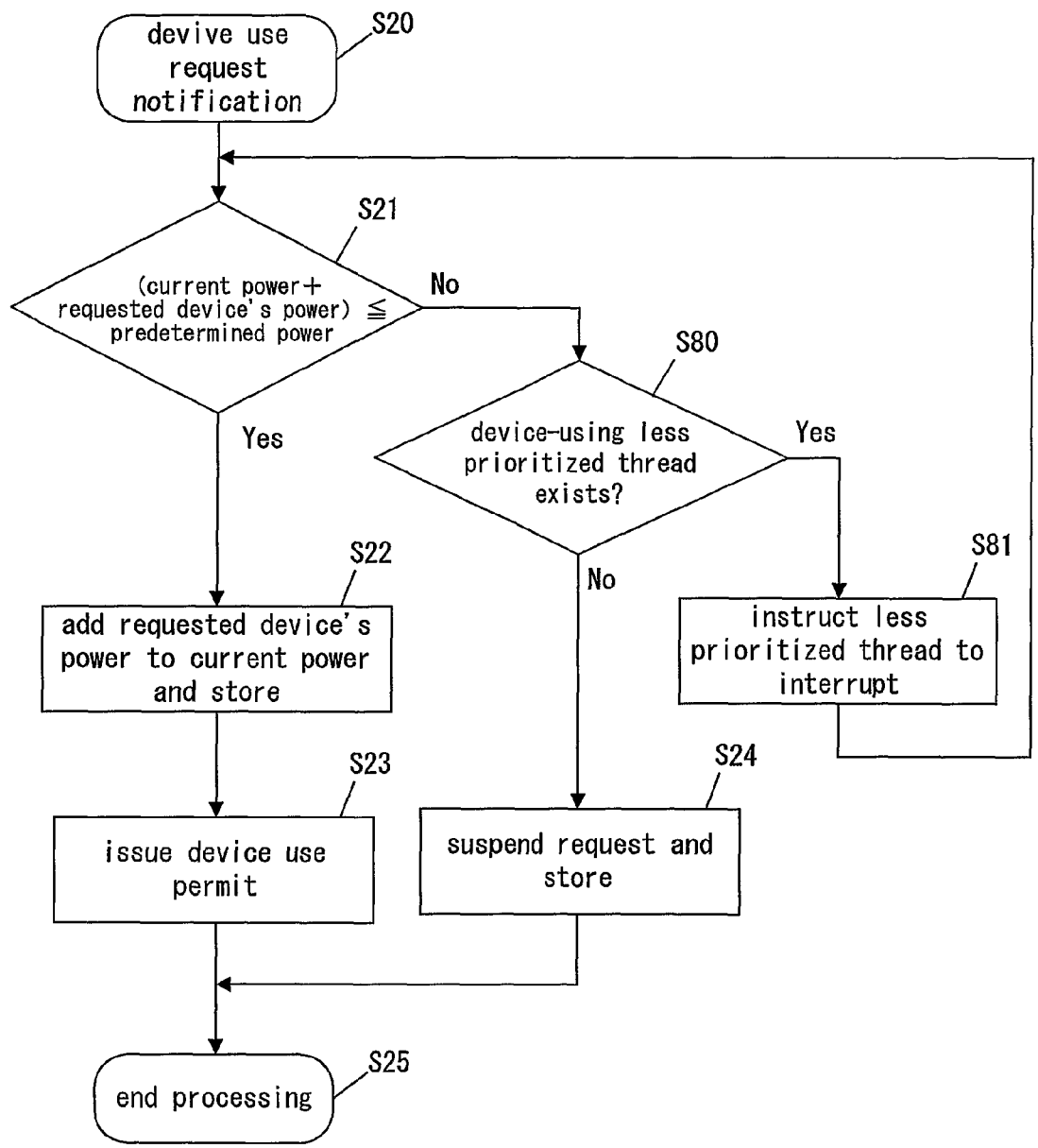
FIG. 19 is a flowchart illustrating a course of processing provided by a peak power-managing unit according to an eighth embodiment.
Figure 20:
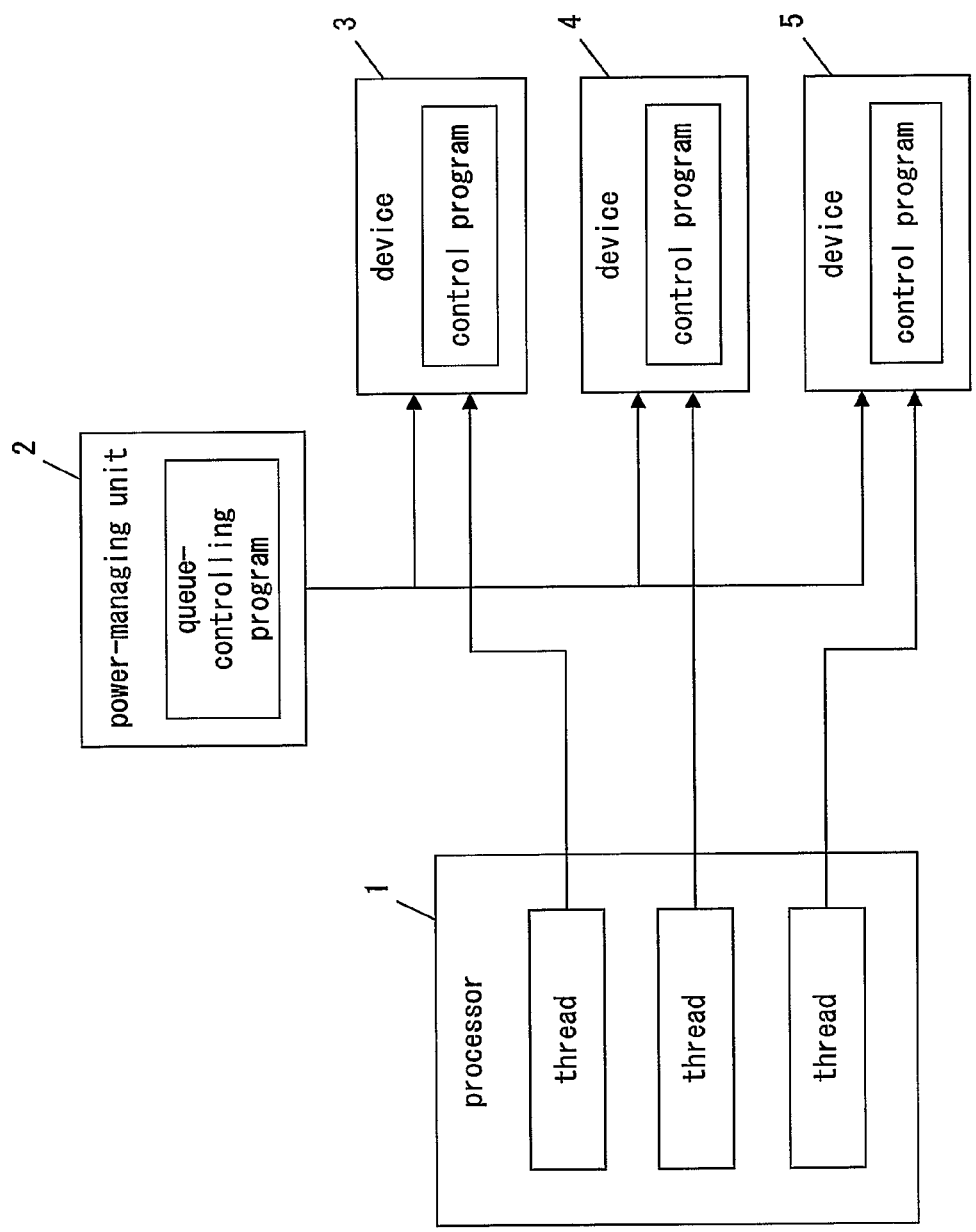
FIG. 20 is a block diagram illustrating a prior art power consumption-managing apparatus.

FIG. 19 is a flowchart illustrating a course of processing provided by a peak power-managing unit according to the present embodiment.

At step S20, the peak power-managing unit 10 receives a use request notification from any one target device among devices 30-33.

At step S21, the peak power-managing unit 10 determines whether, when adding a power consumption value of the target device, which addressed a use request, to the current total power consumption value, the added total power consumption value still remains within a predetermined specified value or, e.g., the maximum power value.

When the determination in step S21 results in "YES" or that the added total power consumption value still remains within the predetermined specified value, then at step S22, the peak power-managing unit 10 adds the power consumption value of the target device to the current total power consumption value. At step S23, the peak power-managing unit 10 issues a use permit notification to the target device.

Conversely, when the determination in step S21 results in the contrary or "NO", at step S80 the peak power-managing unit 10 searches operating devices for a less prioritized thread.

When the search in step S80 results in the absence of the less prioritized thread, then at step S24 the peak power-managing unit 10 stores the use request from the target device in the suspended request storage sub-unit 12.

Conversely, when the search in step S80 results in the presence of the less prioritized thread, then at step S81 the peak power-managing unit 10 instructs the less prioritized thread to interrupt operation thereof.

In the electronic apparatus according to the present embodiment, the thread instructed to interrupt the operation thereof receives an interruption notification. The notification allows the thread to be interrupted to be ready for the next scheduling by performing effective processing such as interruption-related processing and re-calculation using new data.

Each of the processors according to the first to eighth embodiments acts as a master device. Each of the devices according to the first to eighth embodiments may be any one of a DMA, a vector-calculating apparatus, a communication apparatus, or a processor itself, provided that the device works as a slave device under the control of the processor acting as the master device. The number of the devices may be two or greater.

The devices may be individual devices, or otherwise may be integrated into a single package such as a system LSI.

The peak power-managing unit 10 according to the first to eighth embodiments is a processing unit operable to manage the peak power, and may be configured entirely by hardware logic, or otherwise may be configured wholly or partially by part of software of the processors 20-22 or alternatively by software of a fourth processor.

Assuming that the peak power-managing unit 10 is configured by software on processors that treat the threads, the peak power-managing unit 10 may optionally be a processing unit comparable to merely call by a system call. In this instance, a device use request-indicating signal and a device use permit-indicating signal can be included as software system call parameters. In more general, these signals may be implemented as semaphore in which a semaphore counter is identified as an electrical power value. The priority information added to the device use request-indicating signal may alternatively be a value determined in accordance with the priority of a software thread that issues a use request.

As described above, an object of the present invention is to provide an electrical power-managing art operable to control the peak power of an electronic apparatus including several processors and several devices, and operable to operate the devices in accordance with constantly updated power information. A variety of changes may be made without departing from the sprits of the present invention.

The present invention provides an electrical power-managing art operable to control the peak power of the electronic apparatus including several processors and several devices, and operable to run the devices in accordance with incessantly updated power information.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

INDUSTRIAL APPLICABILITY

The electronic apparatus according to the present invention is applicable to a primarily battery cell-driven electronic apparatus such as a personal digital assistance, and to the field of application of such an electronic apparatus.

The invention claimed is:

1. An electronic apparatus comprising:
    a processor acting as a master device, said processor being operable to process a plurality of threads;
    a plurality of devices, each of which acts as a slave device; and
    a peak power-managing unit operable to manage peak power,
    wherein said processor addresses, to said peak power-managing unit, a device use request for use of a target device among said plurality of devices when said processor processes the plurality of threads,
    wherein said peak power-managing unit in receipt of the device use request issues, to said processor, a device use permit notification that permits the device use request, when determining that a total power consumption value is equal to or smaller than a predetermined value, the total power consumption value including power consumption value added by operation of the target device, and suspends the device use request when determining that the total power consumption value is greater than the predetermined value, wherein the device use request is suspended until the total power consumption value is again equal to or smaller than the predetermined value;
    wherein said processor receives the device use permit notification of the target device from said peak power-managing unit, and then sets up a course of action of the target device in accordance with most currently updated information.

2. An electronic apparatus as defined in claim 1, wherein said peak power-managing unit comprises a power information storage unit operable to store electrical power information on a current power consumption value, and a suspended request storage unit operable to store and suspend the device use requests addressed by said processor for said plurality of devices,
- wherein said processor addresses the device use request to said peak power-managing unit when using a target device among said plurality of devices, and
- wherein said peak power-managing unit in receipt of the device use request issues, to the processor that addressed the device use request, the device use permit notification that permits the device use request, when said peak power-managing unit determines, with reference to the power information stored in said power information storage unit, that a total power consumption value is equal to or smaller than a predetermined value, the total power consumption value including a power consumption value added by operation of the target device, but said peak power-managing unit suspends and stores the device use request in said suspended request storage unit when determining, with reference to the power information stored in said power information storage unit, that the total power consumption value is greater than the predetermined value.

3. An electronic apparatus as defined in claim 2, wherein when any one of said plurality of devices completes a course of action, said peak power-managing unit determines device availability with reference to the device use requests stored in said suspended request storage unit, in chronological order in which they are stored in said suspended request storage unit.

4. An electronic apparatus as defined in claim 2, wherein said peak power-managing unit further comprises a priority-comparing unit,
- wherein said processor addresses a device use request containing device use priority to said peak power-managing unit when using a target device among said plurality of devices,
- wherein the peak power-managing unit suspends and stores the device use request in said suspended request storage unit when determining that a total power consumption value is greater than a predetermined value, the total power consumption value including a power consumption value added by operation of the target device, and
- wherein when any one of said plurality of devices completes a course of action, then said peak power-managing unit determines device availability with reference to the device use request stored in said suspended request storage unit, in descending order of the device use priority.

5. An electronic apparatus as defined in claim 2, wherein said peak power-managing unit further comprises a peak power-detecting unit operable to detect a peak power-consumption value,
- wherein said peak power-detecting unit updates the electrical power information stored in said power information storage unit each time when detecting the peak power-consumption value.

6. An electronic apparatus as defined in claim 1, wherein said peak power-managing unit further comprises a priority-comparing unit,
- wherein said processor addresses a device use request containing device use priority to said peak power-managing unit when using a target device among said plurality of devices, and
- wherein said priority-comparing unit compares the device use priority between the target device and an operating device, and when the operating device is lower in device use priority than the target device, then said peak power-managing unit interrupts operation of the operating device, thereby issuing the device use permit notification to the target device.

7. An electronic apparatus as defined in claim 6, wherein said peak power-managing unit issues an interruption instruction to a thread when said peak power-managing unit interrupts the operation of the operating device, in which the operating device was activated by the thread.

8. An electronic apparatus as defined in claim 1, wherein said peak power-managing unit further comprises a priority-comparing unit,
- wherein said processor addresses a device use request containing device use priority to said peak power-managing unit when using a target device among said plurality of devices, and
- wherein said priority-comparing unit compares a device use priority between the target device and an operating device, and when the operating device is lower in the device use priority than the target device, then said peak power-managing unit reduces power consumption of the operating device, thereby issuing the device use permit notification to the target device.

9. An electronic apparatus as defined in claim 8, wherein said peak power-managing unit reduces at least one of a clock frequency of the operating device that is lower in the device use priority, and power source voltage of the operating device that is lower in the device use priority.

10. An electronic apparatus as defined in claim 1, wherein said peak power-managing unit further comprises a priority-comparing unit,
- wherein said processor addresses a device use request containing device use priority to said peak power-managing unit when using a target device among said plurality of devices, and
- wherein said priority-comparing unit compares a device use priority between the target device and an operating device, and when the operating device is lower in the device use priority than the target device, then said peak power-managing unit increases power consumption of the operating device.

11. An electronic apparatus as defined in claim 10, wherein said peak power-managing unit increases at least one of a clock frequency of the operating device that is lower in the device use priority, and power source voltage of the operating device that is lower in the device use priority.

12. An electronic apparatus comprising:
- a processor acting as a master device;
- a plurality of devices, each of which acts as a slave device;
- a peak power-managing unit operable to manage peak power; and
- a power-measuring unit operable to measure a power consumption value of each of said plurality of devices,
- wherein said peak power-managing unit comprises a suspended request storage unit operable to store and suspend device use requests addressed by said processor for said plurality of devices,
- wherein said processor addresses a device use request to said peak power-managing unit when using a target device among said plurality of devices,
- wherein said peak power-managing unit in receipt of the device use request issues, to the processor that addressed the device use request, a device use permit notification that permits the device use request, when said peak power-managing unit determines, with reference to a current power consumption value from said power-measuring unit, that a total power consumption value is equal to or smaller than a predetermined value, the total power consumption value including a power consumption value added by operation of the target device, but said peak power-managing unit suspends and stores the device use request in said suspended request storage unit when determining that the total power consumption value is greater than the predetermined value, wherein the device use request is suspended until the total power consumption value is again equal to or smaller than the predetermined value, and wherein said processor receives the device use permit notification of the target device from said peak power-managing unit, and then sets up a course of action of the target device in accordance with most currently updated information.

13. An electronic apparatus as defined in claim 12, wherein said peak power-managing unit further comprises a priority-comparing unit, wherein said processor addresses a device use request containing device use priority to said peak power-managing unit when using a target device among said plurality of devices, and wherein said priority-comparing unit compares a device use priority between the target device and an operating device, and when the operating device is lower in the device use priority than the target device, then said peak power-managing unit executes at least one of steps of interrupting operation of the operating device and of reducing power consumption of the operating device, whereby said peak power-managing unit issues the device use permit notification to the target device.

14. An electronic apparatus as defined in claim 12, wherein said peak power-managing unit further comprises a priority-comparing unit, wherein said processor addresses a device use request containing device use priority to said peak power-managing unit when using a target device among said plurality of devices, wherein the peak power-managing unit suspends and stores the device use request in said suspended request storage unit when determining that a total power consumption value is greater than a predetermined value, the total power consumption value including a power consumption value added by operation of the target device, and wherein when any one of said plurality of devices completes a course of action, then said peak power-managing unit determines device availability with reference to the device use request stored in said suspended request storage unit, in descending order of the device use priority.

15. An electronic apparatus as defined in claim 12, further comprising a battery unit including a residual quantity-managing unit operable to manage residual electrical power quantity, wherein said processor addresses, to said peak power-managing unit, a device use request for use of a target device among said plurality of devices when said processor uses the target device among said plurality of devices, and wherein said peak power-managing unit in receipt of the device use request issues, to said processor, a use permit notification that permits the device use request, when said peak power-managing unit determines that a total power consumption value is equal to or smaller than a predetermined value, the total power consumption value including a power consumption value added by operation of the target device, the predetermined value being calculated based on the residual electrical power quantity from said residual quantity-managing unit.

16. A peak power-controlling method operable to control peak power of an electronic apparatus including a processor acting as a master device and a plurality of devices, each of which acts as a slave device, the method comprising:

addressing a device use request from the processor when the processor uses a target device among the plurality of devices;

issuing, to the processor that addressed the device use request, a device use permit notification that permits the device use request, when determining that a total power consumption value is equal to or smaller than a predetermine value, the total power consumption value including a power consumption value added by operation of the target device;

suspending the device use request when determining that the total power consumption value is greater than the predetermine value, wherein the device use request is suspended until the total power consumption value is again equal to or smaller than the predetermined value; and receiving the device use permit notification of the target device, and then setting up a course of action of the target device in accordance with most currently updated information.

17. A peak power-controlling method as defined in claim 16, further comprising:

determining device availability with reference to a plurality of suspended device use requests including the device use request, in chronological order in which they are suspended.

18. A peak power-controlling method as defined in claim 17, wherein said addressing the device use request comprises addressing a device use request containing device use priority, and wherein said determining the device availability comprises determining the device availability in descending order of the device use priority.

* * * * *